(12) United States Patent
Potter et al.

(10) Patent No.: US 12,206,651 B2
(45) Date of Patent: Jan. 21, 2025

(54) SYSTEMS, METHODS AND CONTROLLERS FOR SECURE COMMUNICATIONS

(71) Applicant: Deere & Company, Moline, IL (US)

(72) Inventors: John Potter, Waterloo, IA (US); Kevin Puetz, Waterloo, IA (US); Jason D. Malarkey, Fargo, ND (US); David Lindner, Fargo, ND (US); Warren L. Schroeder, Waterloo, IA (US); David Bailey, Urbandale, IA (US); Ritesh Kondekar, Pune (IN); Jens Koehler, Rülzheim (DE); Sebastian Labitzke, Rülzheim (DE); Arnaud Jakob, Rülzheim (DE)

(73) Assignee: Deere & Company, Moline, IL (US)

( * ) Notice: Subject to any disclaimer, the term of this patent is extended or adjusted under 35 U.S.C. 154(b) by 228 days.

(21) Appl. No.: 17/427,862

(22) PCT Filed: Jan. 16, 2020

(86) PCT No.: PCT/US2020/013854
§ 371 (c)(1),
(2) Date: Aug. 2, 2021

(87) PCT Pub. No.: WO2020/219128
PCT Pub. Date: Oct. 29, 2020

(65) Prior Publication Data
US 2022/0131839 A1 Apr. 28, 2022

Related U.S. Application Data

(60) Provisional application No. 62/838,630, filed on Apr. 25, 2019, provisional application No. 62/838,611, filed on Apr. 25, 2019.

(51) Int. Cl.
*H04L 9/40* (2022.01)
*H04L 9/08* (2006.01)

(52) U.S. Cl.
CPC ........ *H04L 63/0435* (2013.01); *H04L 9/0825* (2013.01); *H04L 9/085* (2013.01); *H04L 9/0861* (2013.01); *H04L 9/0891* (2013.01)

(58) Field of Classification Search
None
See application file for complete search history.

(56) References Cited

U.S. PATENT DOCUMENTS 6,212,280 B1 * 4/2001 Howard, Jr. .......... G06F 21/602
380/279
8,254,571 B1 * 8/2012 Boyen ................... H04L 9/0869
713/168

(Continued)

OTHER PUBLICATIONS

Vector CSM Crypto Service Manager, https://www.vector.com/int/en/know-how/technologies/safety-security/automotive-cybersecurity/#c2917, last assessed Jan. 6, 2022.

(Continued)

*Primary Examiner* — Bassam A Noaman
(74) *Attorney, Agent, or Firm* — Harness, Dickey & Pierce, P.L.C.

(57) ABSTRACT

In an example embodiment, a system includes a first controller configured to generate a network key and transform the network key and a second controller configured to obtain the transformed network key and form a network with the first controller, each of the first controller and the second controller being configured to generate a same symmetric key using the network key and values from the other of the first controller and second controller.

35 Claims, 15 Drawing Sheets

(56) References Cited

U.S. PATENT DOCUMENTS

| | | | |
|---|---|---|---|
| 10,009,325 | B1 | 6/2018 | David et al. |
| 10,218,499 | B1* | 2/2019 | El Idrissi ............... G06F 21/44 |
| 10,237,739 | B2 | 3/2019 | Michalski et al. |
| 10,243,732 | B1* | 3/2019 | Herzerg ............... H04L 9/0819 |
| 10,348,508 | B2 | 7/2019 | Marko et al. |
| 10,567,471 | B2 | 2/2020 | Patsiokas et al. |
| 10,673,617 | B1 | 6/2020 | Antoniou et al. |
| 11,713,058 | B2 | 8/2023 | Fukuzawa et al. |
| 11,716,329 | B2 | 8/2023 | Gorgenyi et al. |
| 2001/0023482 | A1* | 9/2001 | Wray ............... H04L 63/0442 713/162 |
| 2010/0042839 | A1* | 2/2010 | Ho ............... H04L 9/0841 713/169 |
| 2015/0052360 | A1* | 2/2015 | Ravishankar ....... H04L 63/0428 713/171 |
| 2016/0277189 | A1* | 9/2016 | Ahn ............... H04L 9/3273 |
| 2016/0277463 | A1* | 9/2016 | Nagarajan ............. H04L 45/026 |
| 2017/0085537 | A1 | 3/2017 | Benedek |
| 2017/0111177 | A1* | 4/2017 | Oguma ............... H04L 9/3273 |
| 2017/0139795 | A1* | 5/2017 | Komano ............ H04L 63/1425 |
| 2018/0084412 | A1* | 3/2018 | Alfred ............... H04W 12/0431 |
| 2019/0007211 | A1* | 1/2019 | Chunduri ............... H04L 9/30 |
| 2019/0044730 | A1* | 2/2019 | Woo ............... H04L 9/3242 |
| 2019/0238555 | A1* | 8/2019 | Buffard ............... H04L 63/123 |
| 2019/0245691 | A1* | 8/2019 | Takemori ............. H04L 9/0822 |
| 2019/0261176 | A1* | 8/2019 | Yamazaki ............. H04L 63/061 |
| 2020/0100108 | A1 | 3/2020 | Everson et al. |
| 2020/0177398 | A1* | 6/2020 | Takemori ............ H04L 63/0823 |
| 2020/0211301 | A1 | 7/2020 | Zhang et al. |
| 2020/0213287 | A1 | 7/2020 | Zhang et al. |
| 2020/0313885 | A1 | 10/2020 | Mondello et al. |
| 2020/0313898 | A1 | 10/2020 | Troia et al. |
| 2020/0313907 | A1 | 10/2020 | Mondello et al. |
| 2020/0389791 | A1* | 12/2020 | Takemori ............... H04L 9/08 |

OTHER PUBLICATIONS

"Specification of Crypto Service Manager," AUTOSAR CP Release 4.3.1., pp. 1-233, Sep. 8, 2017.

Farag, "CANTrack: Enhancing Automotive CAN Bus Security Using Intuitive Encryption Algorithms", 2017, p. 1-5.

Halabi et al., "A Lightweight Synchronous Cryptographic Hash Chain Solution to Securing the Vehicle CAN bus", 2017, p. 1-6.

Zhang et al., "Improving Timing Behavior on Encrypted CAN Buses", 2019, p. 1-6.

"Automotive Cybersecurity", Feb. 9, 2020, p. 1-11.

Chen, et al. "Enhanced Key Derivation Function of HMAC-SHA-256 Algorithm in LTE Network", 2012, p. 1-4.

International Search Report for International Application No. PCT/US2020/013854 dated Mar. 31, 2020.

Written Opinion of the International Searching Authority for International Application No. PCT/US2020/013854 dated Mar. 31, 2020.

Schmandt et al, Raising the bar for vehicular security with a lightweight message authentication protocol, dated Jul. 1, 2017, pp. 188-196.

International Preliminary Report on Patentability dated Nov. 4, 2021.

Woo, S. et al., "CAN ID Shuffling Technique (CIST): Moving Target Defense Strategy for Protecting In-Vehicle CAN," IEEE Access, vol. 7, pp. 15521-15536, Feb. 1, 2019.

European Office Action issued in application No. 20704753.1 dated Apr. 25, 2023 (05 pages).

Network Management J1939TM-81_201703, Mar. 9, 2017, retrieved from <https://www.sae.org/standards/content/j1939/81_201703/>.

P. E. Abi-Char et al. 'A Secure Key Management Scheme for Hierarchical Access Control with Secret Key Validity Checking' IEEE, 2021, pp. 27-33.

J. Lin et al. 'Efficient Group Key Management Protocol with One Way-Key Derivation' IEEE Conference on Local Computer Networks 30th Anniversary, Computer Society, 2005, pp. 1-8.

S. Li et al. 'Identity-Based Hybrid Format-Preserving Encryption Scheme' IEEE 5th Information Technology and Mechantronics Engineering Conference (ITOEC 2020), pp. 470-474.

M. Kleppmann 'Implementing Curve25519/X25519: A Tutorial on Elliptic Curve Cryptography' Manuscript submitted to ACM, 2022, pp. 1-34.

M. Malik et al. 'A Survey of Key Bootstrapping Protocols Based on Public Key Cryptography in the Internet of Things' IEEE Access, 2019, vol. 7, 2019, pp. 27443-27464.

J. Dong et al. 'Towards High-performance X25519/448 Key Agreement in General Purpose GPUs' IEEE Conference on Communications and Network Security (CNS), 2018, pp. 1-9.

I. Haitner et al. 'On the (Im) Possibility of Key Dependent Encryption' International Association for Cryptologic Research, 2009, pp. 202-219.

* cited by examiner

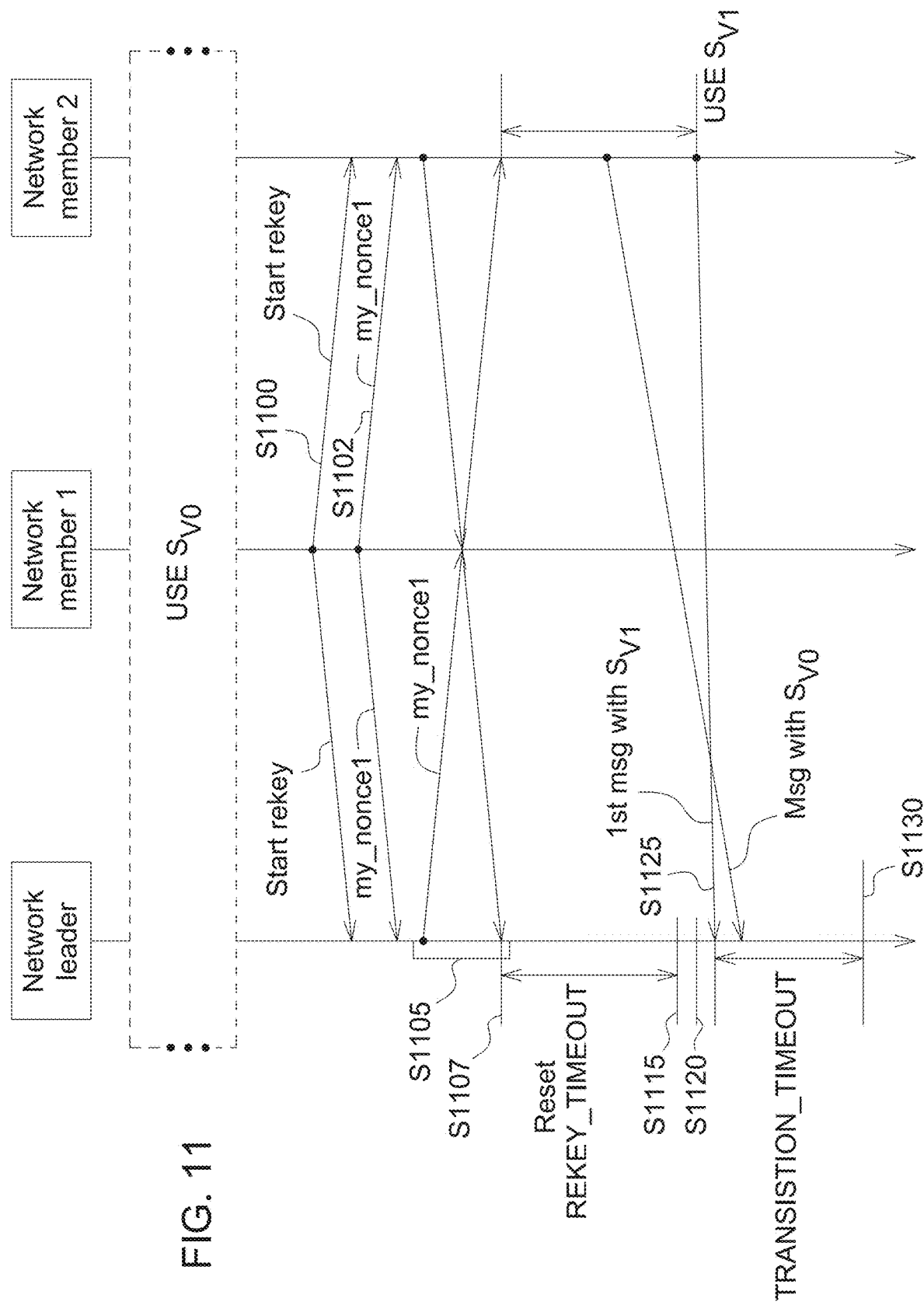

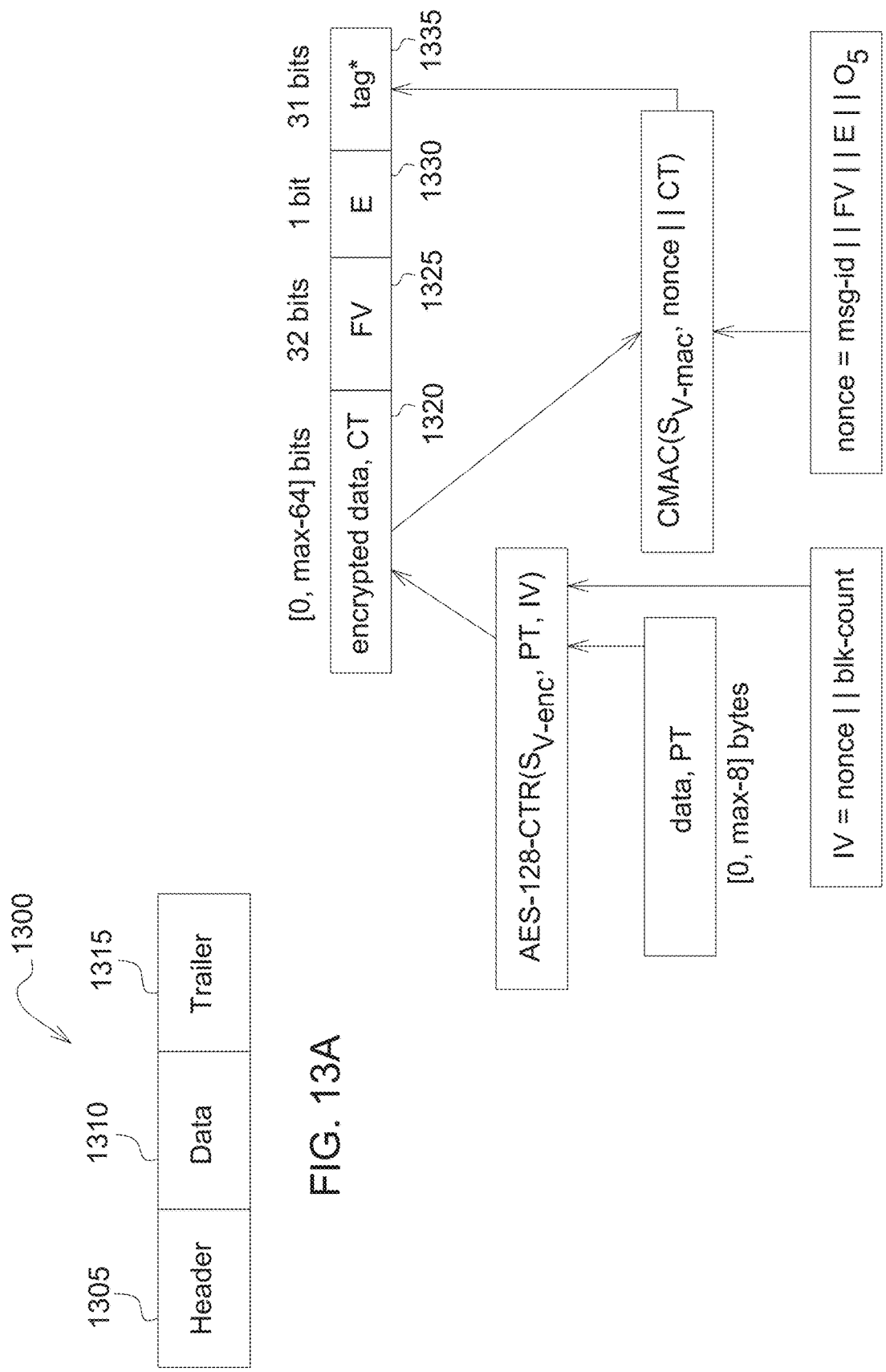

SYSTEMS, METHODS AND CONTROLLERS FOR SECURE COMMUNICATIONS

CROSS REFERENCE TO RELATED APPLICATIONS

The present application is the national phase under 35 U.S.C. § 371 of PCT International Application No. PCT/US2020/013854 which has an International filing date of Jan. 16, 2020, which claims priority under 35 U.S.C. § 119 to U.S. Provisional Application No. 62/838,630 filed Apr. 25, 2019 and U.S. Provisional Application No. 62/838,611 filed Apr. 25, 2019, the entire contents of each of which are hereby incorporated by reference.

FIELD

Example embodiments are related to systems, methods and controllers for secure communications.

BACKGROUND

Electronic control units (ECUs) are used in vehicles (e.g., automobiles, tractors and excavators) to control one or more systems in the vehicle. The ECUs communicate with each other over a vehicle data bus.

SUMMARY

Communications between the ECUs on the vehicle data bus may be accessed and/or modified by an unauthorized party. Thus, the safety of the vehicle may be compromised.

The inventors have invented systems and methods for secure communications. In some example embodiments, authorized ECUs are allowed to join a secure network where public key cryptography is used as well as a shared message key. In some example embodiments, there is no external database of secrets, thus improving the security by eliminating a possible intrusion point.

At least one example embodiment provides a system including a first controller configured to generate a network key and transform the network key and a second controller configured to obtain the transformed network key and form a network with the first controller, each of the first controller and the second controller being configured to generate a same symmetric key using the network key and values from the other of the first controller and second controller.

BRIEF DESCRIPTION OF THE DRAWINGS

Example embodiments will be more clearly understood from the following detailed description taken in conjunction with the accompanying drawings. FIGS. 1-13B represent non-limiting, example embodiments as described herein.

FIG. 1 is a block diagram of a vehicle system, according to some example embodiments;

FIG. 2 illustrates a flow diagram of a network formation and rekeying according to some example embodiments;

FIG. 3 illustrates an example embodiment of the network formation shown in FIG. 2;

FIGS. 4-5 illustrates a rekeying process according to some example embodiments;

FIG. 6 illustrates a timing diagram of a transition from a symmetric key to another symmetric key according to some example embodiments;

FIGS. 7-9 illustrate a rekeying process according to other example embodiments;

FIG. 11 illustrates a timing diagram of the transition from a symmetric key to another symmetric key according to some example embodiments;

FIG. 12 illustrates a method of managing freshness values according to some example embodiments;

FIG. 13A illustrates a CAN FD message format; and

FIG. 13B illustrates a data field format for a data field according to some example embodiments.

DETAILED DESCRIPTION

Figure 1:
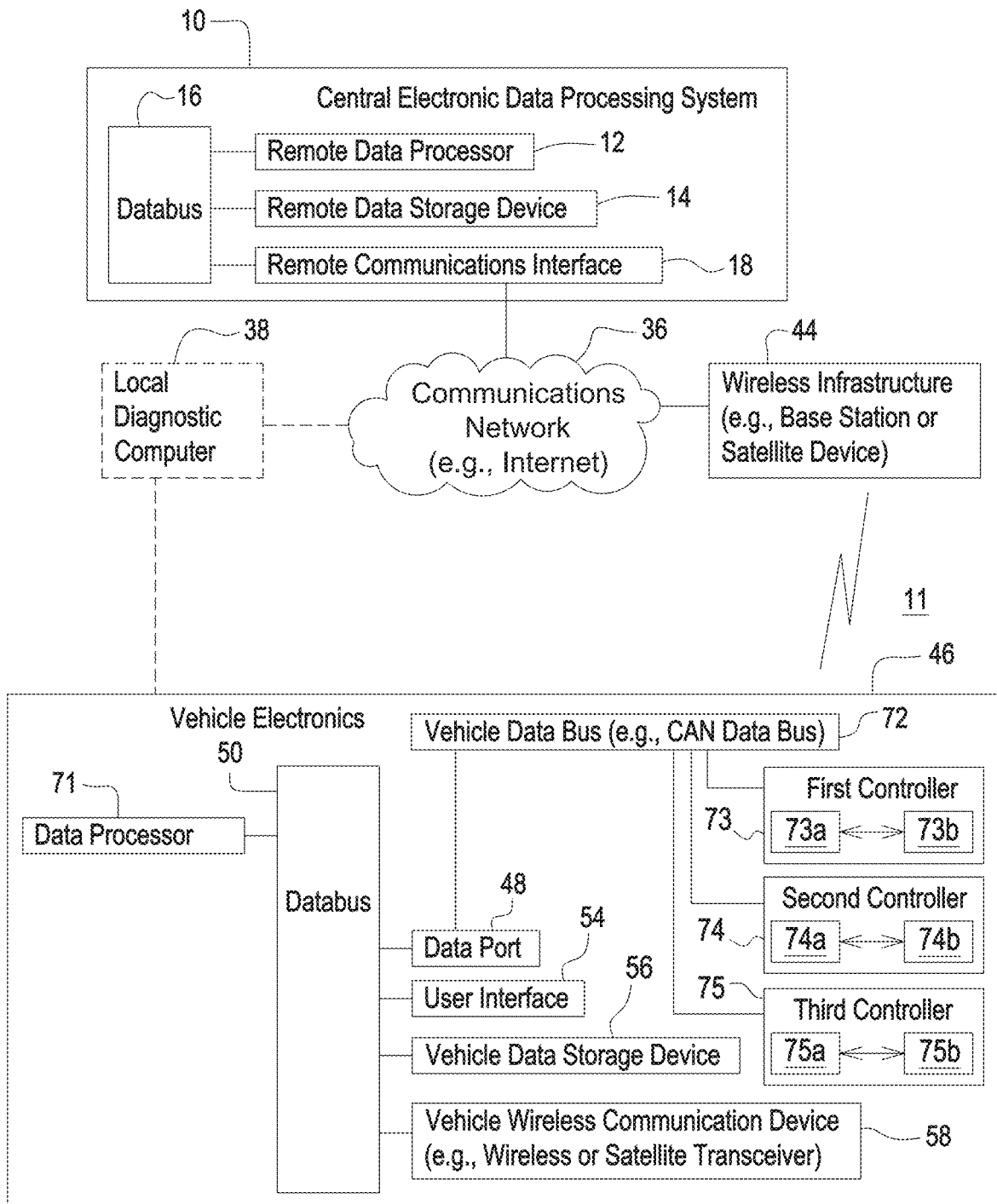

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware.

Such existing hardware (e.g., data processors and controllers) may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits.

Further, at least one embodiment of the invention relates to a non-transitory computer-readable storage medium comprising electronically readable control information stored thereon, configured such that when the storage medium is used in a controller of a motor system, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects.

The term memory is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways. The term data storage device may be used interchangeably with computer-readable medium.

In accordance with one embodiment, FIG. 1 illustrates a vehicle system 11 and a central electronic data processing system 10.

In some example embodiments, the system includes a first controller configured to generate a network key and transform the network key and a second controller configured to obtain the transformed network key and form a network with the first controller, each of the first controller and the second controller being configured to generate a same symmetric key using the network key and values from the other of the first controller and second controller, the first controller and the second controller being network members when the network is formed.

In some example embodiments, the first controller and the second controller are configured to communicate over a vehicle data bus.

In some example embodiments, the vehicle data bus is a controller area network flexible data (CAN FD) bus, Ethernet, a sub-combination thereof or a combination thereof.

In some example embodiments, each of the first controller and the second controller are configured to generate the same symmetric key at a selected event.

In some example embodiments, the selected event is a new power cycle, a third controller joins the network, a security challenge, a lapse of a timer, a clearing of a counter, a request to upload software to reprogram one of the member controllers in the network, a reset of one of the network members in the network, a rollover of a freshness value, a reboot of one of the network members, a sub-combination thereof or a combination thereof.

In some example embodiments, the first controller includes an identification number, the identification number being a determined number, and the first controller is configured to send at most a portion of the identification number of the first controller, obtain at most a portion of an identification number of the second controller, and form the network if the identification number of the first controller and the identification number of the second controller are the same.

In some example embodiments, the first controller is configured to generate a symmetric shared key between the first controller and the second controller using the network key, the symmetric shared key including a first key for encryption and a first key for message authentication code (MAC), the same symmetric shared key and the symmetric shared key being different.

In some example embodiments, the identification number of the first controller is part of a public key certificate.

In some example embodiments, the identification number of the first controller is a vehicle identification number.

In some example embodiments, the identification number of the first controller is a unique manufactured code.

In some example embodiments, the first controller includes a hardware security module (HSM) for storing the network key.

In some example embodiments, the first controller is configured to perform a process to include a third controller in the network when generating the same symmetric key.

In some example embodiments, the first controller is configured to communicate with the second controller using the same symmetric key.

In some example embodiments, the first controller is configured to generate the same symmetric key by generating a first nonce value, sending the first nonce value to the second controller, receiving a second nonce value from the second controller, determining the same symmetric key after a threshold time of receiving the second nonce value based on the network key, the first nonce value and the second nonce value.

In some example embodiments, the first controller is configured to send messages to the second controller having encrypted data and a freshness value (FV).

In some example embodiments, each message includes a data field between 0 and 64 bits, a freshness value field of 32 bits for the FV, an encryption field of one bit to indicate the data field includes encrypted data and a tag field of 31 bits.

In some example embodiments, the first controller is configured to increment the FV when one of the messages is placed in a transmit queue.

In some example embodiments, the first controller is configured to reset the FV when the same symmetric key is generated.

At least some example embodiments provide a controller including a memory storing instructions and at least one processor configured to execute the instructions to cause the controller to generate a network key and transform the network key, transmit the transformed network key on a bus, form a network with at least one other controller on the bus using the transformed network key and generate a same symmetric key using the network key and a value from the at least one other controller.

In some example embodiments, the bus is a vehicle data bus.

Referring to FIG. 1, in one embodiment, the central electronic data processing system 10 that is capable of communicating with vehicle electronics 46 via a communications network 36 and wireless infrastructure 44.

The vehicle electronics 46 comprises a vehicle data processor 71, a vehicle data storage device 56, and a vehicle wireless communications device 58, a data port 48, a user interface 54, a vehicle data bus (e.g., controller area network (CAN) data bus an ISO bus, Ethernet, a sub-combination thereof or a combination thereof) 72, a first controller (i.e., a first ECU) 73, a second controller (i.e., a second ECU) 74 and a third controller (i.e., a third ECU) 75. While only three controllers are illustrated, it should be understood that the vehicle electronics 46 may include more or less than three controllers. Each of the controllers may provide a functionality of a machine (e.g., a vehicle or an implement) such as transmission control, individual nozzle control (on a sprayer), engine control, operator controls in the cab, hydraulic controls, row unit control on a planter, etc.

The first controller 73, the second controller 74 and the third controller 75 may be electronic control units (ECUs). Each of the controllers 73, 74 and 75 may include processing circuitry 73a, 74a, 75a, respectively, and storage devices 73b, 74b and 75b, respectively. The processing circuitry 73a, 74a and 75a are configured to cause the controllers 73, 74 and 75 to perform their respective functions and may do so by executing computer-readable instructions stored in the storages devices 73b, 74b and 75b.

The data processor 71 is capable of communicating with one or more of the following devices via a data bus 50: the vehicle data storage device 56, the data port 48, user interface 54, and the vehicle wireless communications device 58.

The data port 48 provides an interface, such as common memory between the data bus 50 and the vehicle data bus 72. The first controller 73, the second controller 74 and the third controller 75 are coupled to the vehicle data bus 72. The first controller 73, the second controller 74 and the third controller 75 may have storages devices 73b, 74b and 75b (e.g., nonvolatile random access memory) or another storage device for storing, retrieving and processing payload data, calibration data, configuration data, payloads, components of configuration files or other computer instructions that are downloaded or provided via the local diagnostic computer 38 or via the electronic data processing system 10.

The vehicle data processor 71 may comprise one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

The vehicle data storage device 56 comprises electronic memory, nonvolatile random access memory, an optical storage device, a magnetic storage device, or another device for storing and accessing electronic data on any recordable, rewritable, or readable electronic, optical, or magnetic storage medium for storing executable instructions.

A user interface 54 comprises one or more of the following: a keypad, a keyboard, a touch screen display, a switch, a pointing device (e.g., electronic mouse), a display (e.g., liquid crystal display or plasma display), or another device for inputting, entering selecting, receiving, or displaying input or output data for a computer, controller, electronics or other electronic data processing system.

The data port 48 may comprise an input/output data port 48, such as an UART, a data transceiver with buffer memory, a device that supports communications with the local diagnostic computer 38, or an interface device that supports communication between the data bus 50 and the vehicle data bus 72.

In an alternate embodiment, the data port 48 may comprise a short-range wireless connection, such as IEEE (Institute of Electrical and Electronics Engineers) 802.11 connection or a blue-tooth wireless connection. The data port 48 supports a connection, transmission, receipt or exchange of data between the vehicle electronics 46 and the local diagnostic computer 38.

In another alternate embodiment, the remote data storage device 14 or the vehicle data storage device 56 comprises or stores a common messaging interface for communication with vehicle electronics 46, the common message interface providing a communications interface between the vehicle electronics 46 and at least one application program.

The central electronic data processing system 10 and wireless infrastructure 44 are coupled to the electronic communications network 36 (e.g., the Internet).

A service technician or user may use a local diagnostic computer 38 that communicates, directly, to the vehicle electronics 46 via a short-range wireless connection, a wireline connection, or another local connection. For example, the services technician might use the local diagnostic computer 38 to communicate with the vehicle electronics 46, if a vehicle is located in or brought to a service center, where the service technician works. Otherwise, the service technician can perform remotely some of many diagnostic and software reprogramming tasks via the communications network 36 and the wireless infrastructure 44.

The central electronic data processing system 10 comprises a remote data processor 12, a remote data storage device 14, and a remote communications interface 18 coupled to a data bus 16. In one embodiment, the central electronic data processing system 10 may be implemented by a general purpose computer or a server that is programmed with software modules stored in the remote data storage device 14. The remote data processor 12 is capable of communicating with the one or more of the following via the data bus 16: the remote data storage device 14, and remote communications interface 18.

The remote data processor 12 may comprise one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

The remote data storage device 14 comprises electronic memory, nonvolatile random access memory, an optical storage device, a magnetic storage device, or another device for storing and accessing electronic data on any recordable, rewritable, or readable electronic, optical, or magnetic storage medium storing executable instructions.

The remote communications interface 18 may comprise a transceiver or other device for communicating, transmitting, or receiving data via the communications network 36. In one embodiment, the communications network 36 comprises the Internet, the public switched telephone network (PSTN) or another public, or private electronic communications network 36, or a communications link (e.g., telecommunications line or microwave link) that supports communication to or from the wireless infrastructure 44.

The wireless infrastructure 44 supports wireless communications between the vehicle electronics 46 and the central electronic data processing system 10. The wireless infrastructure 44 may comprise one or more of the following: one more wireless base stations that are capable of communicating over the communications network 36 via a gateway an Internet service provider, or otherwise; one or more satellite transceivers; a satellite downlink receiver, a satellite uplink transmitter; a satellite communications system; a cellular infrastructure network; a trunking system, a point-to-multipoint communications system, a point-to-point communications link, a land-based wireless communications network 36, or the like.

In example embodiments, the controllers 73, 74 and 75 communicate with each other on the vehicle data bus 72. To reduce and/or prevent unauthorized access to the communications, the controllers 73, 74 and 75 are configured to communicate with the use of a network key and a symmetric key. For example, the first controller 73 is configured to generate a network key and transform the network key and the second controller 74 and the third controller 75 are configured to obtain the transformed network key, recover the network key and form a network with the first controller 73. Each of the first controller 73, the second controller 74 and the third controller are configured to generate a same symmetric key using the network key and values from each controller.

Figure 2:
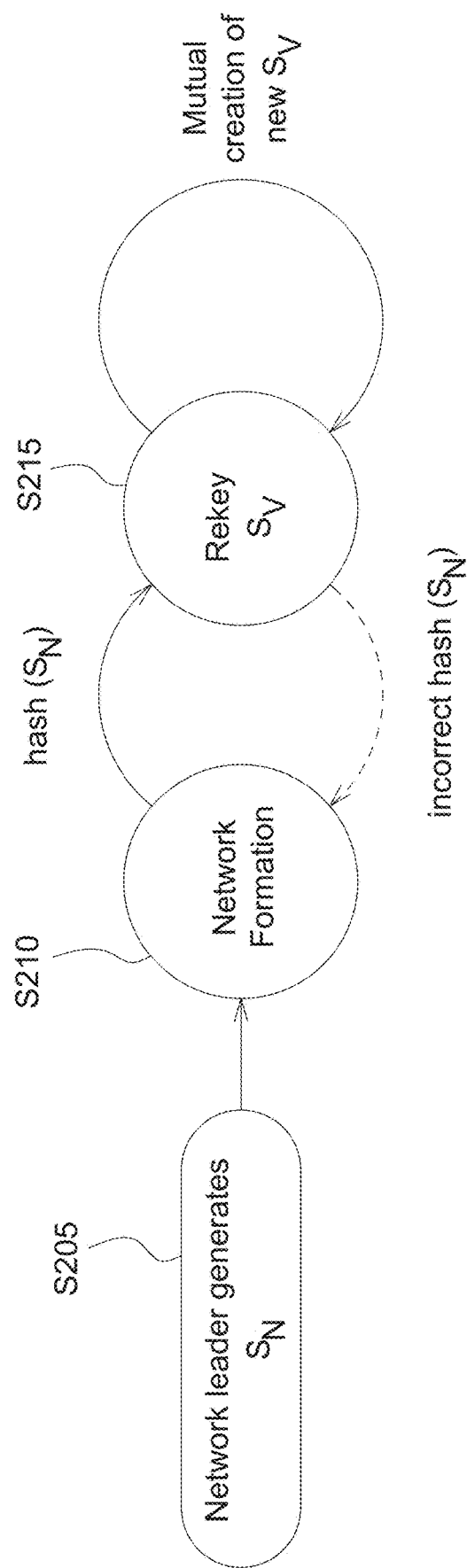

FIG. 2 illustrates a flow diagram of a network formation and rekeying according to example embodiments.

At least some example embodiments provide a method including generating a first network key, forming a network of a first controller and second controllers using the first network key, the first network key being a shared key between the first controller and the second controllers, obtaining values from the second controllers and determining a common symmetric key for the network based on the first network key and the values from the second controllers and a value of the first controller.

In some example embodiments, the first controller and the second controllers are on a vehicle data bus.

In some example embodiments, the vehicle data bus is a controller area network flexible data (CAN FD) bus, Ethernet, a sub-combination thereof or a combination thereof.

In some example embodiments, the forming the network includes transforming the first network key and broadcasting the transformed first network key on a vehicle data bus to the second controllers.

In some example embodiments, the forming the network includes broadcasting at most a portion of an identification number of the controller on the vehicle data bus, obtaining at most a portion of an identification number at least one of the second controllers and validating the at least one second controller using the portion of the identification number.

In some example embodiments, the identification number of the first controller is part of a public key certificate.

In some example embodiments, the forming the network includes generating a first key for encryption and a first key for message authentication code (MAC) between the first controller and the at least one second controller.

In some example embodiments, the values from the second controllers and the value of the first controller are nonce values.

In some example embodiments, the determining the common symmetric key includes ordering the nonce values and determining the common symmetric key based on the ordered nonce values and the first network key.

In some example embodiments, the method further includes adding a third controller to the network during the determining the common symmetric key.

In some example embodiments, the method further includes determining another symmetric key after the adding.

In some example embodiments, the method further includes transmitting a message to one of the second controllers on the vehicle data bus after determining the common symmetric key, wherein the message includes encrypted data and a freshness value (FV).

In some example embodiments, the message includes a data field between 0 and 64 bits, a freshness value field of 32 bits for the FV, an encryption field of one bit to indicate the data field includes encrypted data and a tag field of 31 bits.

In some example embodiments, the method further includes incrementing the FV when the message is placed in a transmit queue.

In some example embodiments, the method further includes resetting the FV when the same symmetric key is generated.

As shown in FIG. 2, the network formation includes the generation of a network key $S_N$ at S205, the formation of a network at S210 using the network key $S_N$ and initial generation and rekeying of a symmetric key $S_V$ at S215.

The network key $S_N$ may be generated by a network leader such as the first controller 73. The network leader is a single member ECU that is programmed to create a secure network. A network leader may be a type of controller that appears in all versions of a machine (as opposed to a controller that only appears on some machines based on the machine optionality), has hardware for generating a true random number, has memory to hold logic for creating networks and has a capacity at each power cycle to confirm the network key $S_N$ and enroll a new controller into the secure network should a new controller be added.

In an example embodiment, the network leader includes a VIN (vehicle identification number) certificate and stores code indicating that it is a network leader.

The VIN certificate is an X.509 certificate that chains from the ECU to a trusted root. The VIN certificate provides evidence that the ECU is authorized to be on the vehicle.

A member ECU (or member controller) is a controller on the vehicle that is considered both authentic and authorized. An authentic ECU is cryptographically tied to a manufacturer, owner, and/or other entity via a birth certificate, which is an X.509 certificate that chains from the ECU to a trusted root at the manufacturer, owner, and/or other entity. An authorized ECU is cryptographically tied to a vehicle's VIN.

A VIN certificate may be issued in a couple of different ways. In some example embodiments, a VIN certificate for an ECU is issued during the manufacturing process. The vehicle factory attests that they are putting a specific ECU on the vehicle. To get the VIN certificate in some example embodiments, the factory presents the ECU's birth certificate as well as providing a VIN to the manufacturer's public key infrastructure (PKI). That PKI will then issue the VIN certificate. In other example embodiments, a service technician in the field, or a customer, provides the ECU's serial number and the VIN to the manufacturer's PKI (e.g., via a web page). In this case the customer or service technician is attesting that they are putting the specific ECU on the vehicle. The manufacturer issues a VIN certificate to the ECU that is evidence that the manufacturer has authorized the controller to participate in secure communications on the specific VIN.

All member ECUs start with a network key $S_N=0_{128}$ as a temporary key. Thus, the network leader initially has a network key $S_N$ value of $0_{128}$. When a network leader is turned on, the network leader looks at the network key $S_N$. The network leader includes hard-coded logic to determine if the network key $S_N$ is equal to $0_{128}$. If the network leader determines the network key $S_N$ is $0_{128}$, the network leader then determines to generate a network key $S_N$. The network leader stores the network key $S_N$ in non-volatile memory. In example embodiments where a member controller stores $0_{128}$ as the network key $S_N$, during a re-key process (discussed below), the member controller will send a hash of $0_{128}$ over the bus. The leader network recognizes the member controller sent a hash of $0_{128}$ and starts a network formation with the member controller by broadcasting a one-way function value of the network key $S_N$.

The network leader then generates a new network key $S_N$. In some example embodiments, the network leader generates the new network key $S_N$ using a true random number generator (TRNG) of 128 bits or a pseudorandom number generator (PRNG) of 128 bits. The generation of a network key $S_N$ is a centralized process and, thus, is only performed by the network leader.

The network leader maintains and uses the new network key $S_N$ for communications even when a new controller is added to the network. The network leader may replace the new network key $S_N$ when the network leader loses the new network key $S_N$. In some example embodiments, network member controllers that are not the network leader may request a new $S_N$ if the network leader controller failed and was replaced by a new controller. This new controller will generate its own network key $S_N$ and when the new network leader determines network member controllers don't know the new network key $S_N$, the new network leader will share it. Thus, the new network key $S_N$ may be considered "long-lived" network key.

At S210, the network leader then forms a network with other controllers using the new network key $S_N$.

Figure 3:
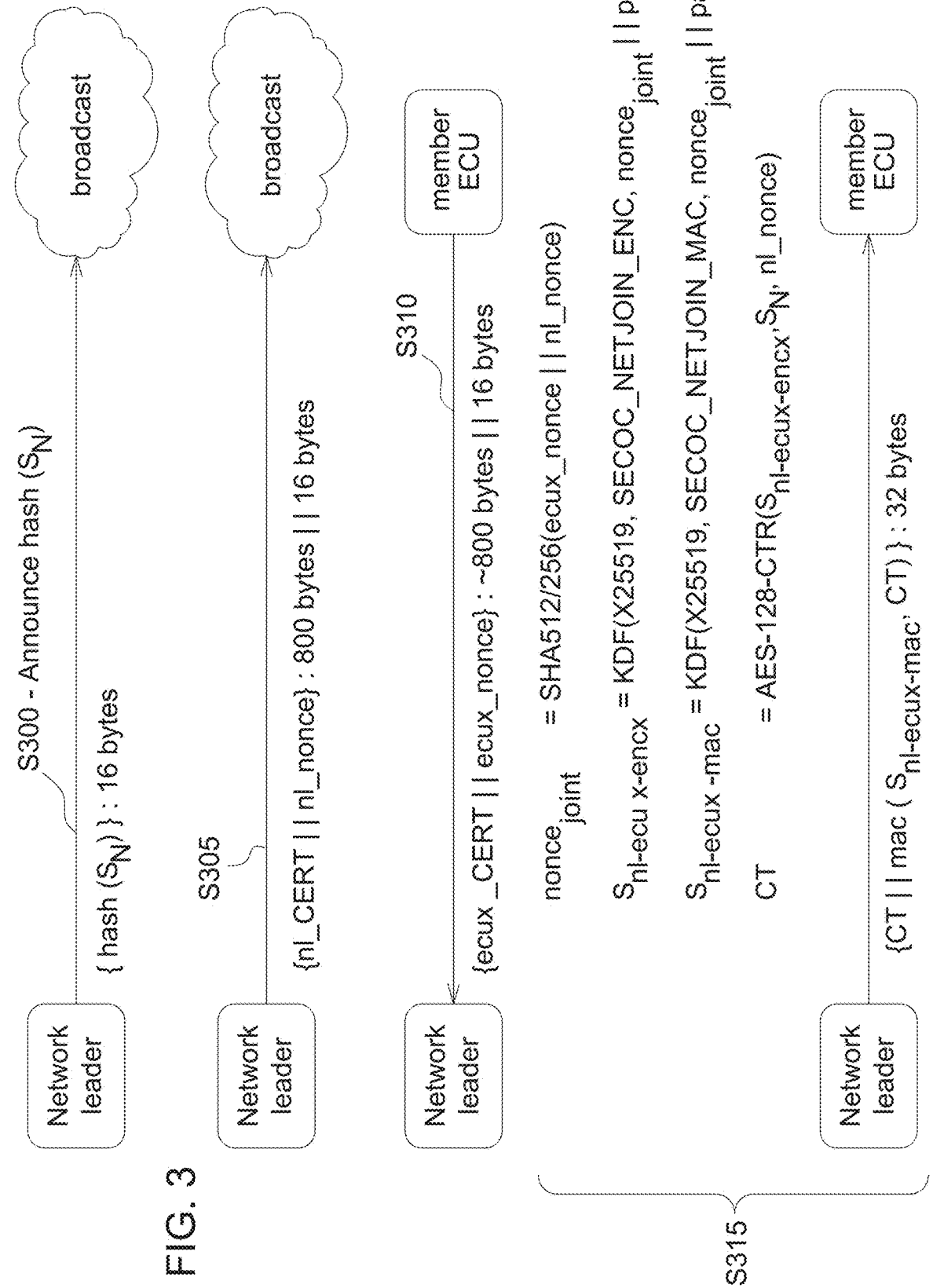

FIG. 3 illustrates an example embodiment of the network formation shown in FIG. 2. The network formation may be performed once the components are assembled on the vehicle data bus and when a member controller attempts to join the network.

Table 1 provides a list of keys that may be used in the network formation.

TABLE 1

| Key | Description |
| --- | --- |
| $P_{ecux\text{-}ka}$ | Public key for key agreement of member controller x |
| $P_{nl\text{-}ka}$ | Network leader's public key for key agreement |
| $K_{ecux\text{-}ka}$ | Private key of member controller x for key agreement |
| $K_{nl\text{-}ka}$ | Network leader's private key for key agreement |
| $S_{nl\text{-}ecux}$ | Symmetric shared secret between the network leader and member controller x |
| $S_N$ | Network key shared between all members and the network leader. |

The shared secret $S_{nl\text{-}ecux}$ is a key used to encrypt the network key $S_N$. The key $S_{nl\text{-}ecux}$ is used to prevent an authorized controller to see the value of the network key $S_N$ that the network leader is sharing with the member controller x. For each ECU x that the network leader shares $S_N$ with, a different $S_{nl\text{-}ecux}$ is used. In other words, only the network leader and the member controller x know the key $S_{nl\text{-}ecux}$. In some example embodiments, the network leader and the member controller x use the key $S_{nl\text{-}ecux}$ once to get the network key $S_N$ into the member controller x, and then the key $S_{nl\text{-}ecux}$ is deleted.

Table 2 provides a list of certificates that may be used in the network formation.

TABLE 2

| Certificate | Description |
| --- | --- |
| ecux_CERT | VIN certificate containing $P_{ecux\text{-}ka}$ of member controller x |
| nl_CERT | Leaf of network leader VIN certificate containing $P_{nl\text{-}ka}$ |

Table 3 provides a list of cryptographic primitives that may be used in the network formation.

TABLE 3

| Primitive | Description |
| --- | --- |
| AES-128 | Block cipher |
| Cipher-based message authentication code (CMAC) | Message authentication code (MAC) based on AES-128 |
| KDF | Miyaguchi-Preneel key derivation function built with AES-128 cipher |
| TRNG | True Random Number Generator |
| SHA512/256 | Hash function (secure hash algorithm) |

At S300, the network leader transforms the network key $S_N$ by performing a one-way function on the network key $S_N$ and broadcasts the transformed network key in a message across the vehicle data bus. Thus, in example embodiments, the value of the network key $S_N$ is not shared explicitly over the vehicle data bus. In some example embodiments, the network leader uses a hash (e.g., SHA512/256) as the one-way function to broadcast hash($S_N$). In some example embodiments, the message containing the transformed network key is 16 bytes, permitting a member controller with a wrong network key to start the network formation process in a timely manner.

The network leader performs S300 upon the network leader's first boot or when the network leader detects a mismatch of hash($S_N$) during the rekeying process (e.g., S215 in FIG. 2), as will described in greater detail below.

After the network leader broadcasts the transformed key, steps S305, S310 and S315 are performed when a member controller does not recognize the network key $S_N$. Thus, steps S305, S310 and S315 are performed by member controllers on the vehicle data bus when the network is initially formed and are performed by the network leader and one newly added member controller when the newly added member controller requests to join the network.

At S305, the network leader broadcasts a message permitting member controllers to validate the VIN certificate of the network leader. More specifically, the network leader broadcasts a message containing a leaf nl_CERT of the VIN certificate (and not a full chain) of the network leader and a randomly generated nonce value nl_nonce. The leaf nl_CERT contains a VIN field and the public key $P_{nl\text{-}ka}$ of the network leader. The randomly chosen nonce value nl_nonce prevents replays.

At S310, each of the member controllers (to be part of the network) validate the VIN certificate of the network leader using the received leaf nl_CERT. More specifically, the full chain of the VIN certificate chains back to the manufacturer, owner and/or other entity. Each of the member controllers may assume the full chain of the VIN certificate is the same as its VIN certificate and uses its own VIN certificate in place of the network leader's full chain. If a member controller determines that its VIN is not the same as the VIN associated with the network leader, the member controller does not participate in the network formation.

Moreover, each member controller sends a message permitting the network leader to validate the VIN certificate of the respective member controller. More specifically, each member controller x sends a message containing a leaf of its VIN certificate (and not a full chain) ecux_CERT and a randomly generated nonce value ecux_nonce.

The randomly generated nonce value ecux_nonce may be 128 bits and the leaf ecux_CERT may be 800 bytes. For each member controller that sends the message containing ecux_CERT to the network leader, the network leader may assume the full chain of the VIN certificate from the member controller is the same as its VIN certificate and uses its own VIN certificate in place of the network leader's full chain. If the network leader determines that its VIN is not the same as the VIN of an associated member controller based on the leaf ecux_CERT, the member controller does not participate in the network formation. If the network leader determines that its VIN is the same as the VIN of the associated member controller, the member controller is authorized and is permitted to participate in the network formation.

While some example embodiments are described using the VIN certificate for authorizing member controllers, example embodiments are not limited thereto. In other example embodiments, member controllers that are integrated into the vehicle at the time the network leader boots may not perform the VIN certificate authorization process described in S305 and S310. The member controllers that are integrated into the vehicle may be provided in a list during the assembly process and stored by the network leader and member controllers.

The list may be updated when a transferrable member is integrated after assembly (e.g., a service part). When a non-integrated member controller is introduced to the vehicle, the non-integrated member controller may have a certificate issued by the manufacturer that ties the non-integrated member controller to the VIN.

The list contains the public keys of the member controllers and may be stored in an encrypted manner. It must be provided in a secure way such as an encrypted payload to the network leader. On installation of a non-integrated member controller, the network leader is updated with a new list that contains the public key of the installed member controller.

The network leader may share its VIN certificate with the member controllers. For each member controller, if the VIN is valid and same as the VIN for the member controller, then the member controller participates in the network formation with the network leader.

Referring back to FIG. 3, at S315, the network leader determines a shared secret $S_{nl\_ecux}$ for each network member controller including a key for encryption $S_{nl-ecux-enc}$ and a key for message authentication code (MAC) $S_{nl-ecux-mac}$ using the nonce values nl_nonce and ecux_nonce.

The network leader determines the key for encryption $S_{nl-ecux-enc}$ and a key for message authentication code (MAC) $S_{nl-ecux-mac}$ as follows:

$$\text{nonce}_{joint}=\text{SHA512/256}(\text{ecux\_nonce}\|\text{nl\_nonce}) \quad (1)$$

$$S_{nl-ecux-enc}=\text{KDF}(X25519,\text{SECOC\_NETJOIN\_ENC}, \text{nonce}_{joint}\|\text{padding}) \quad (2)$$

$$S_{nl-ecux-mac}=\text{KDF}(X25519,\text{SECOC\_NETJOIN\_MAC}, \text{nonce}_{joint}\|\text{padding}) \quad (3)$$

$$CT=\text{AES-128-CTR}(S_{nl-ecux-enc},S_N,\text{nl\_nonce}) \quad (4)$$

where SECOC_NETJOIN_ENC and SECOC_NETJOIN_MAC are constants, AES-128-CTR is counter mode of Advanced Encryption Standard (AES) of 128 bit block size and CT (cipher text) is an encrypted shared secret between the network leader and the member controller x. X25519 is an X25519 key exchange of the public key of the controller x and the private key of the network leader ($P_{ecux-ka}$, $K_{nl-ka}$) or an X25519 key exchange of the private key of the controller x and the public key of the network leader ($K_{ecux-ka}$, $P_{nl-ka}$).

The constants SECOC_NETJOIN_ENC and SECOC_NETJOIN_MAC do not have to be kept secret. By using the constants SECOC_NETJOIN_ENC and SECOC_NETJOIN_MAC, the X25519 key exchange may be used to create two different keys. In some example embodiments, the constant SECOC_NETJOIN_ENC is zero (0) and the constant SECOC_NETJOIN_MAC is one (1).

The padding may be the MD5 padding except the padding is a 32-bit length instead of 64 and the padding includes 8 bits of zero until 96 bits from the start of an AES block. MD5 is described in http://www.faqs.org/rfcs/rfc1321.html (last visited Mar. 14, 2019), the entire contents of which are hereby incorporated by reference.

At S315, for each network member controller, the network leader sends a message including the encrypted shared secret CT and a message authentication code of the key for message authentication code (MAC) $S_{nl-ecux-mac}$ and the encrypted shared secret CT. As shown in FIG. 3, the form mac(s, val) means use of the symmetric key s to create a message authentication code for the value val. The mac makes the packet tamper-evident. If someone tries to change CT, the ECU receiving the packet can detect the tampering attack.

As a result, a network is formed between the network leader and the authorized member controllers. By having possession of the network key $S_N$, a controller is deemed to be a member of the secure network.

Referring back to FIG. 2, the network leader may also start the network formation process when the network leader receives an incorrect hash ($S_N$) from a member controller (e.g., a newly added controller).

At S215, a rekeying process is performed by each network member controller in the network (e.g., the network leader and authorized member controllers) to generate a symmetric key $S_V$. The symmetric key $S_V$ includes a symmetric key $S_{V-ENC}$ used to encrypt messages and a symmetric key $S_{V-MAC}$ to generate a MAC for each encrypted message.

In some example embodiments, the symmetric key $S_V$ may be referred to as a vehicle key. The rekeying process is the process for generating a new symmetric key $S_V$ and is triggered by an event such as a new power cycle (e.g., vehicle start-up), when a new controller joins the network, a security challenge, a lapse of a timer, clearing of a counter, a request to upload software to reprogram one of the network member controllers, a reset of one of the network member controllers, a rollover of a freshness and/or a reboot of one of the network member controllers. Any controller can initiate a rekeying process.

The new symmetric key may be generated using a combination of nonce values that are each generated by a TRNG or a cryptographic PRNG (seeded with at least 128 bits of entropy) and, thus, the new symmetric key may become effectively mathematically unrelated to the previous symmetric key (i.e., random). Due to the rekeying process, only network member controllers have access to the symmetric key $S_V$. The rekeying process may take less than 1000 ms and is performed in the background such than an existing symmetric key continues to be valid until a new symmetric key is generated and used.

When the new symmetric key $S_V$ is generated, each network member controller resets its freshness value FV to zero (or an initial value FV_INIT). In some example embodiments, the FV is a 32-bit value and is used in calculating a MAC to be used to prevent message replays. The FV may reset to $0_{32}$ at the start of a vehicle's power cycle. When the freshness value FV of one of the network member controllers exceeds a maximum FV_MAX, that network member controller may request a rekey.

In some example embodiments, the secure network is rekeyed on every power cycle and after the network key $S_V$ is determined (to be different than $0_{128}$).

Figure 4:
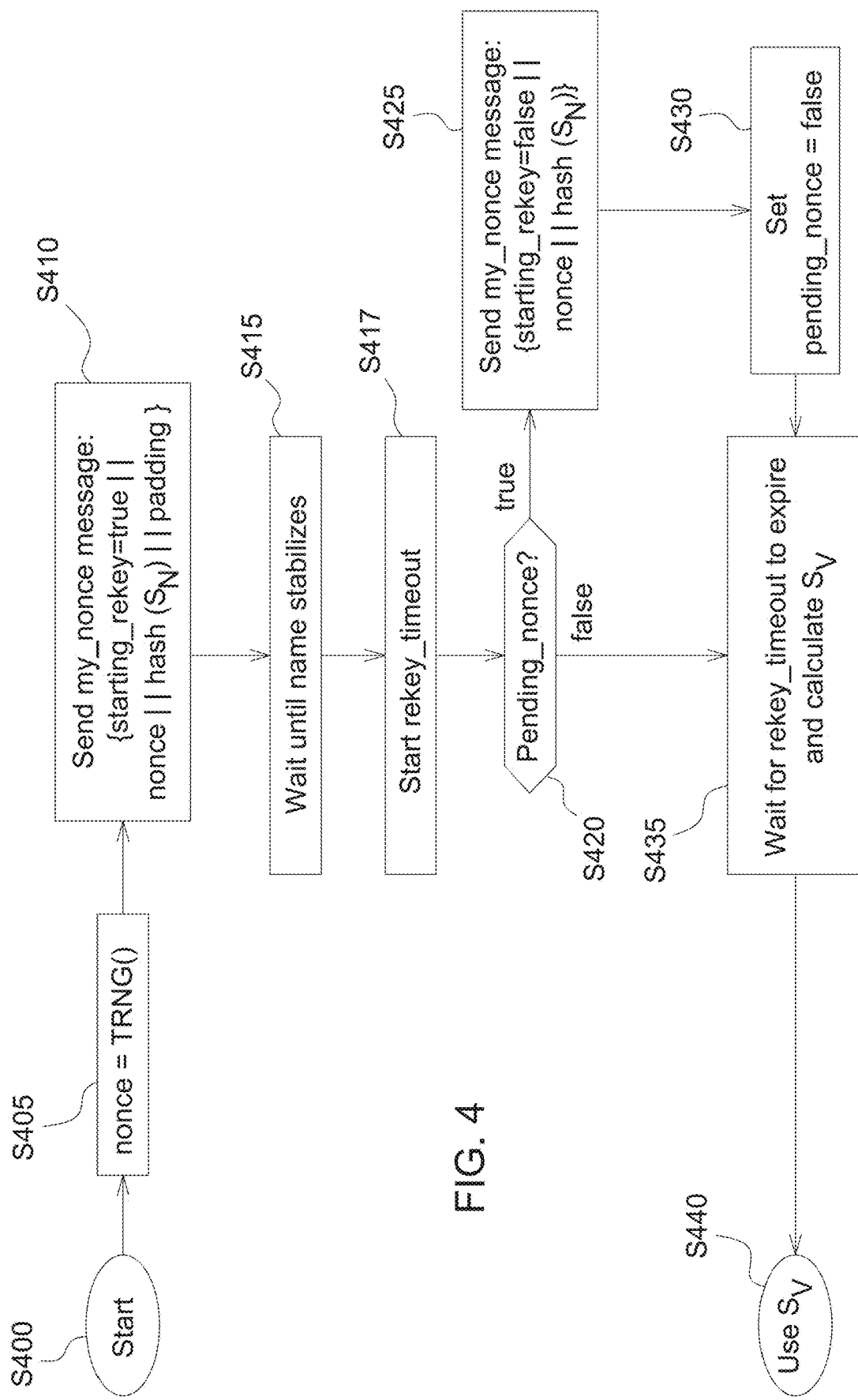
Figure 5:
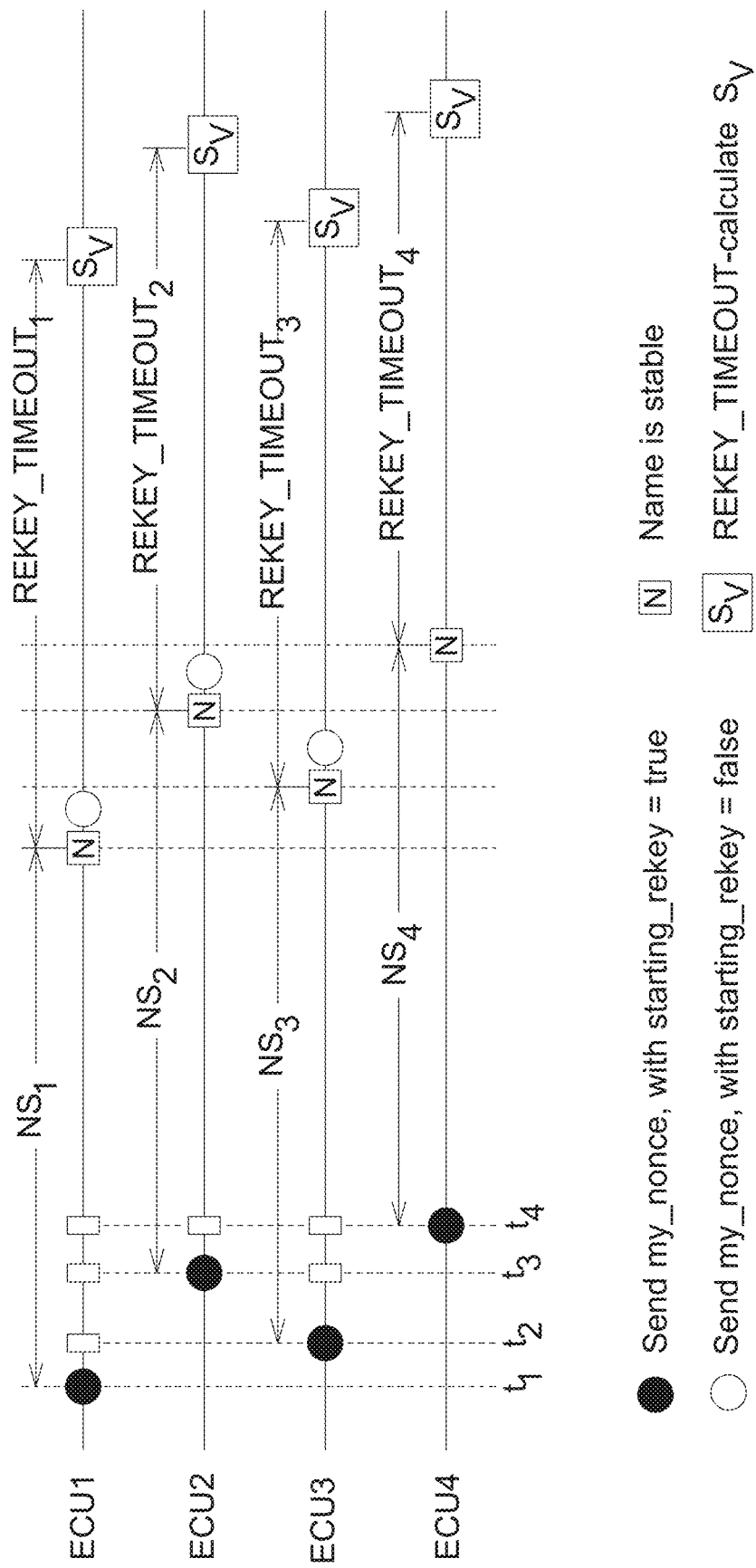

FIGS. 4-5 illustrate a rekeying process according to example embodiments.

The rekeying process in FIG. 4 may be performed by any network member controller.

At S400, a network member controller starts the rekeying process when the network member controller detects a rekeying event. If the rekeying event is a power-on of the network member controller, the network member controller performs name stabilization, which may also be referred to as address claim stabilization. The name may be the NAME, as described in J1939 address claim stabilization, as provided in SAE J1939-81, March 2017, the entire contents of which are hereby incorporated by reference The network member controller performs an address claim by broadcasting a source address it intends to use, receives source addresses from other network member controllers. During name stabilization, a network member controller may be able to communicate to another network member controller that is also claiming that address to resolve conflicts. In some example embodiments, the network member controllers are not permitted to communicate with each other for communications other than address allocation.

At S405, the network member controller generates a nonce value using a TRNG or a cryptographic PRNG (seeded with at least 128 bits of entropy). The nonce value may be 128 bits. At S410, the network member controller sends a my_nonce rekeying message initiating a rekeying process and announcing the nonce value and a one-way function value of the network key $S_N$ such as a hash of the network key $S_N$. The network member controllers may all use the same hash function.

If the network leader detects a wrong one-way function value hash ($S_N$) from a member controller in the network, the network leader re-performs the network formation process described in FIG. 3. In some example embodiments, the network leader broadcasts the correct one-way function value hash ($S_N$) and only member controllers that do not have the correct network key $S_N$ will initiate the network formation process with the network leader.

In addition to the one-way function value of the network key $S_N$ and the nonce value, the my_nonce rekeying message also includes a flag starting_rekey that is set to true. The flag starting_rekey is set to true (e.g., $1_8$) when the network member controller believes it is the first network member controller to share a nonce value and one-way function value of the network key $S_N$ for the particular rekeying process. The my_nonce rekeying message may be a CAN FD message, for example. In some example embodiments, the flag starting_rekey is 1 byte, the nonce value is 16 bytes and the one-way function value of the network key $S_N$ may be 16 bytes. Furthermore, the my_nonce rekeying message may include 15 bytes of padding at the end of the rekeying message.

Using FIG. 5 as an example, member controllers ECU1, ECU2, ECU3 and ECU4 are powered on at times $t_1$, $t_3$, $t_2$, $t_4$, respectively. Upon being powered-on, each member controller sends a my_nonce rekeying message. Thus, the member controller ECU1 sends a my_nonce rekeying message at time $t_1$. Since, the member controller ECU1 believes it is the first member controller to request rekeying, the flag starting_rekey is true. Similarly, ECU2 sends a my_nonce rekeying message at time $t_3$. Since, the member controller ECU2 believes it is the first member controller to request rekeying, the flag starting_rekey is true in its rekeying message. Likewise, the member controllers ECU3 and ECU4 sending rekeying messages with flags starting_rekey being true.

Referring back to FIG. 4, at S415, the network member controller (e.g., ECU1) waits for the name stabilization to be complete. The network controller uses a table timer NS to wait. For example, the table timer NS may be 250 ms for the name stabilization. During the waiting period, the network member controller receives name and address indications from other network member controllers.

Upon the table timer NS expiring, the network member controller starts a rekeying timer rekey_timeout at S417. In some example embodiments, the rekeying timer rekey_timeout may be 250 ms. Each network member controller may have a separate rekeying timer rekey_timeout.

At S420, the network member controller determines whether a flag pending_nonce is set to a true value (e.g., $1_8$). The network member controller initially sets the flag pending_nonce to be true if the network member controller receives a rekeying message from another controller with starting_rekey=true. Setting the flag pending_nonce to true corresponds to the empty rectangles in FIG. 5. Every network member controller, except the last controller to power-on, may eventually have pending_nonce set to true in the example embodiment of FIG. 5. Setting the flag pending_nonce to true is an indication to the network member controller to resend its nonce (the white circle in FIG. 5). If the flag pending_nonce is true, the network member controller resends the rekeying message that is the same as the rekeying message sent in S410 except the flag starting_rekey is set to false (e.g., $0_8$) at S425.

By setting the flag starting_rekey to false, the network member controller indicates that it did not initiate the current rekeying process.

At S430, the network member controller then sets the flag pending_nonce to a false value (e.g., $0_8$).

From S417 until S435 (i.e., until the rekeying timer rekey_timeout expires), the network member controller receives nonce values from all other network member controllers.

When the rekeying timer rekey_timeout of the network member controller expires at S435, the network member controller determines the new shared symmetric key $S_V$ using the nonce values generated in step S405 (i.e., the nonce value a particular network member controller used and the nonce values received from all other network member controllers). As stated above, in some example embodiments, each network member controller has a rekeying timer rekey_timeout. Thus, the rekeying timers of the network member controllers may expire at different times.

Referring to FIG. 5, upon expiration of the timer $NS_1$, the member controller ECU1 completes the name stabilization process and the member controller ECU1 starts the rekeying timer rekey_timeout$_1$. Since the member controller ECU1 did not initiate the most recent rekeying process, the member controller ECU1 sends a rekeying message with the flag starting_rekey set to false. As shown in the example of FIG. 5, the member controller ECU4 starts the current rekeying process because it is the last member controller to power-on. As a result, by the time the member controller ECU4 starts the rekeying timer rekey_timeout$_4$, the member controller ECU4 has received the nonce values (in the rekeying messages) from all other network member controllers. The network member controllers ECU1-ECU4 determine the new shared symmetric key $S_V$ using the nonce values generated at the expiration of the rekeying timers rekey_timeout1-rekey_timeout4, respectively.

To determine the new shared symmetric key $S_V$, each network member controller orders the nonce values based on the values to generate an ordered concatenation nonce$_{all}$ of the nonce values. Each network member controller also performs a one-way function (e.g., a SHA512/256 hash) on the ordered concatenation nonce$_{all}$ to generate the transformed values hash(nonce$_{all}$). Since the nonce values are determined randomly, the bits of hash(nonce$_{all}$) may be uniformly unpredictable and not knowable in advance.

Using the transformed values hash(nonce$_{all}$), each network member controller determines the new symmetric key $S_V$ as follows:

$$S_V = \mathrm{KDF}(S_N, \mathrm{Const}_{SecOC}, \mathrm{hash}(\mathrm{nonce}_{all})) \quad (5)$$

where Const$_{SecOC}$ is a fixed constant.

More specifically, each network member controller waits for all other network member controllers to send a rekeying message and performs the following after waiting a threshold time (e.g., 250 ms):

$$\text{hash(nonce}_{all}) = \text{SHA512/256(nonce}_1 \| \text{nonce}_2 \| \ldots \| \text{nonce}_n) \quad (6)$$

$$S_{V\text{-}ENC} = \text{KDF}(S_N, \text{SECOC\_REKEY\_ENC}, \text{hash(nonce}_{all})) \quad (7)$$

$$S_{V\text{-}MAC} = \text{KDF}(S_N, \text{SECOC\_REKEY\_MAC}, \text{hash(nonce}_{all})) \quad (8)$$

where $\text{nonce}_1 \| \text{nonce}_2 \| \ldots \| \text{nonce}_n$ are the ordered nonce values of the network member controllers from least to largest, and SECOC_REKEY_ENC and SECOC_REKEY_MAC are constants (e.g. 0 and 1, respectively) to assign roles for keys from KDF (e.g., similar to SECOC_NETJOIN_ENC and SECOC_NETJOIN_MAC.

By determining the symmetric key $S_V$ after the threshold time, the determinations can be performed without traffic on the network bus to signal the keying is done. The rekeying can be inferred after the threshold time.

Thus, the determination of the symmetric key $S_V$ is done in parallel by each network member controller. More specifically, since each member knows the network key $S_N$ and knows all the nonce values from the rekeying process, all network member controllers should determine the same symmetric key $S_V$. Thus, this eliminates the transmission of the symmetric key $S_V$ on the network bus.

Moreover, unauthorized controllers may not participate in the rekeying process because they do not know the network key $S_N$ and, as a result, cannot compute the KDF to determine the symmetric key $S_V$.

At S440, the network member controllers begin to use the new symmetric key $S_V$. The network member controllers know to use the new symmetric key $S_V$ because each network member controller resets its FV to $0_{128}$ when using the new symmetric key $S_V$ for a first sent message.

When the flag pending_nonce is set to false (e.g., $0_8$) by a particular network member controller, that particular network member controller clears its nonce table. Each network member controller stores a nonce table in their respective memory to contain the received nonce values associated with network member controllers, respectively, and its own generated nonce value for an iteration of the rekeying process.

Figure 6:
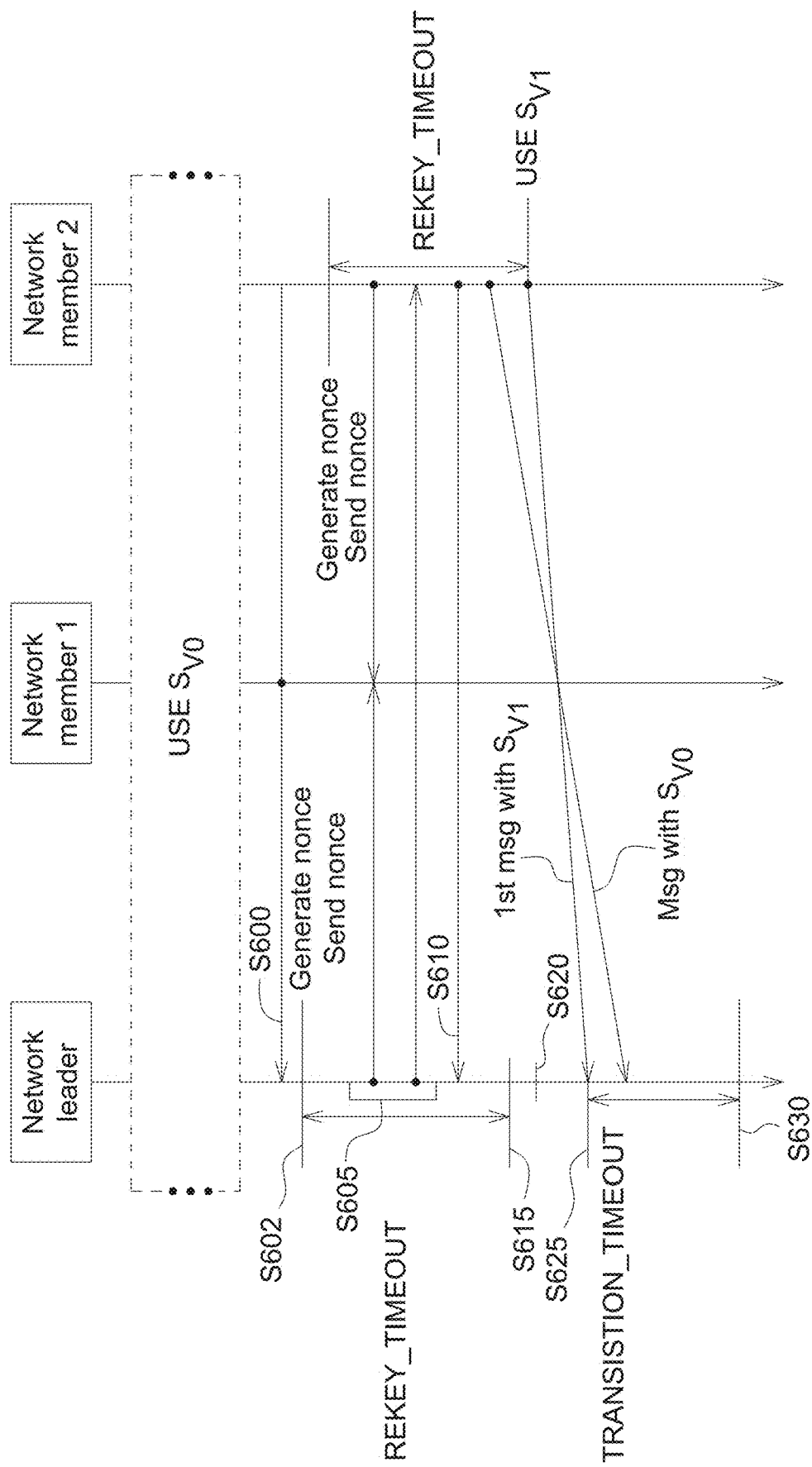

FIG. 6 illustrates a timing diagram of the transition from a symmetric key $S_{V0}$ to a symmetric key $S_{V1}$ according to some example embodiments. While FIG. 6 is described from the perspective of the network leader, it should be understood that any other network member controller may perform the steps described with reference to FIG. 6.

At S600, the network leader receives a rekeying message from a first network member controller. Prior to receiving the rekeying message, the network leader and other network member controllers are using the symmetric key $S_{V0}$. At S602, the network leader starts a timer for the rekeying process. At S605, the network leader broadcasts a rekeying message with its nonce value to the first network member controller and a second network member controller. While the method of FIG. 6 illustrates three network member controllers, it should be understood the network may include more or less than three members.

At S610, the network leader receives a rekeying message from the second network member controller (and any other remaining network member controllers).

At S615, the rekeying timer expires. When the rekeying timer expires, the network leader determines the symmetric key $S_{V1}$ at S620. After determining the symmetric key $S_{V1}$, the network leader may receive messages with the symmetric key $S_{V1}$ or the symmetric key $S_{V0}$.

For example, upon receiving a message with the symmetric key $S_{V1}$ at S625, the network leader starts a transition timer. The transition timer is set to a time period (e.g., 250 ms) where both the symmetric key $S_{V1}$ and the symmetric key $S_{V0}$ are used. As shown in FIG. 6, it is possible for the network leader to receive a message using the symmetric key $S_{V0}$ after receiving a message using symmetric key $S_{V1}$ due to a non-first-in-first-out (FIFO) (e.g., CAN priority arbitration and/or stuck in gateway queue) of the network.

Once the transition timer expires at S630, the network leader stops using the symmetric key $S_{V0}$.

Figure 7:
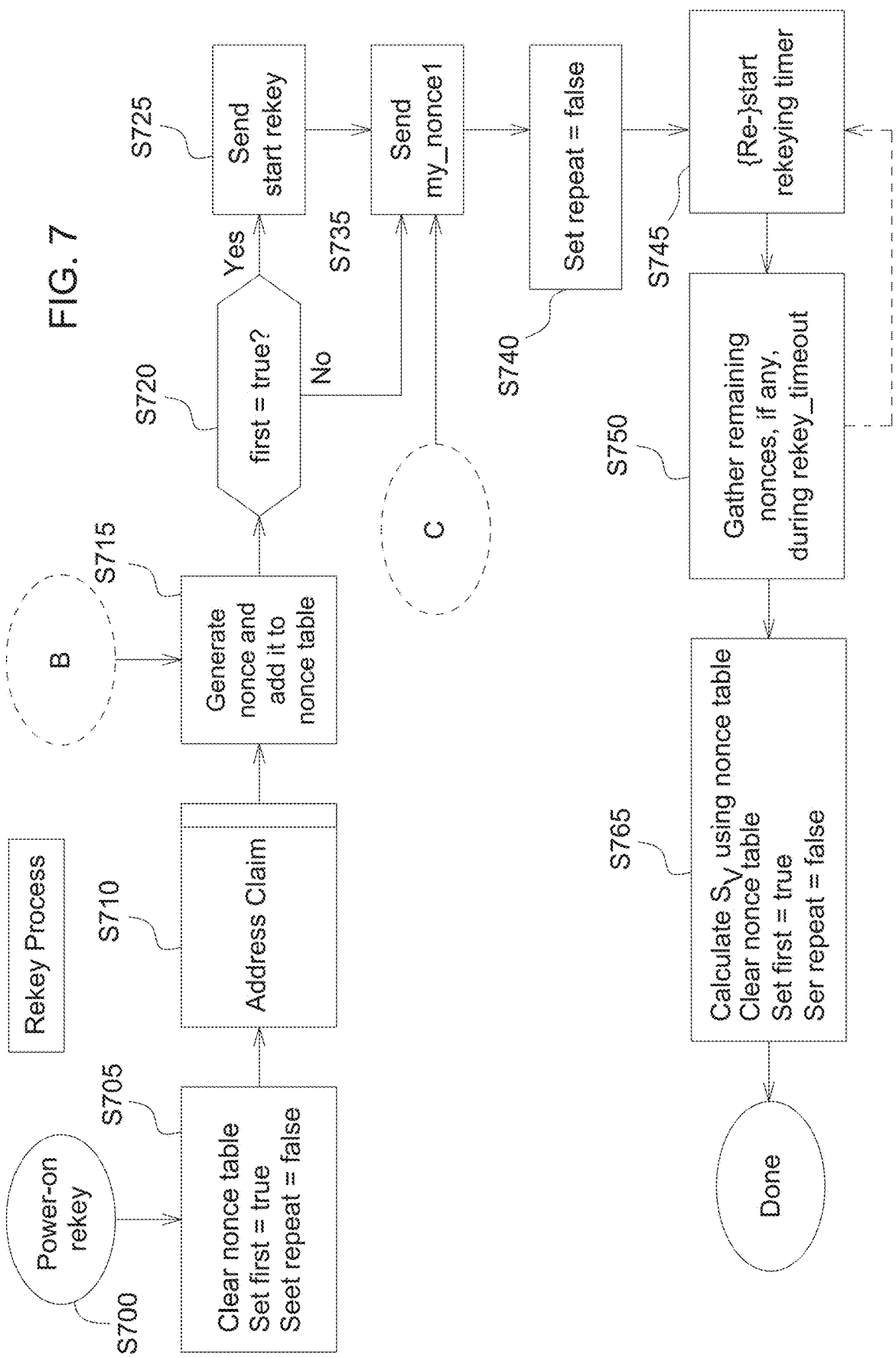
Figure 8:
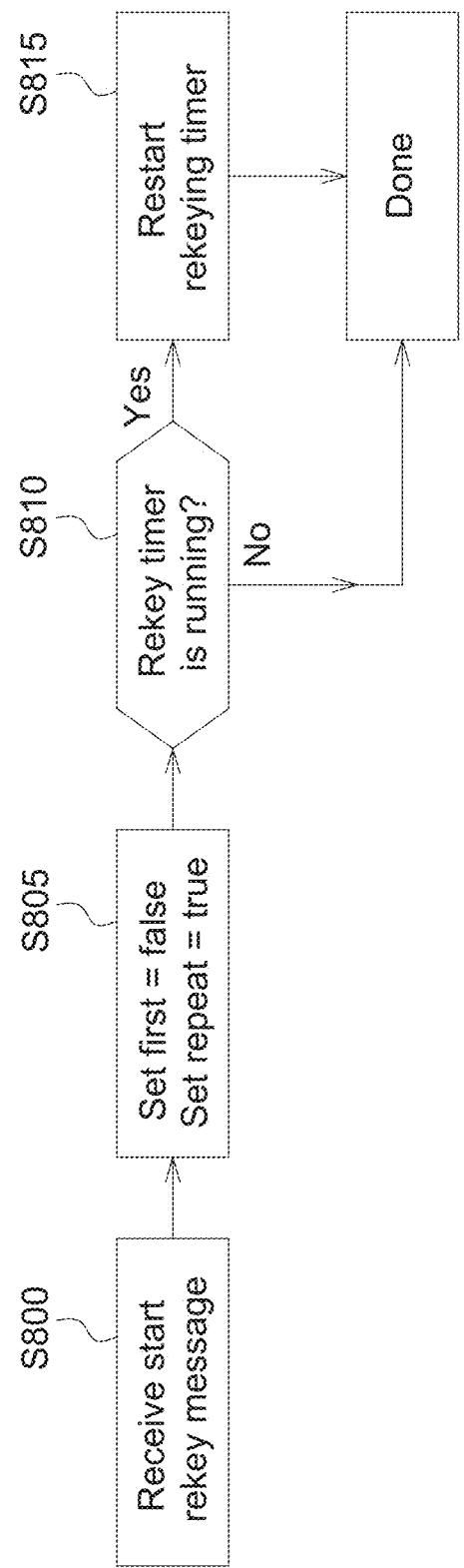
Figure 9:
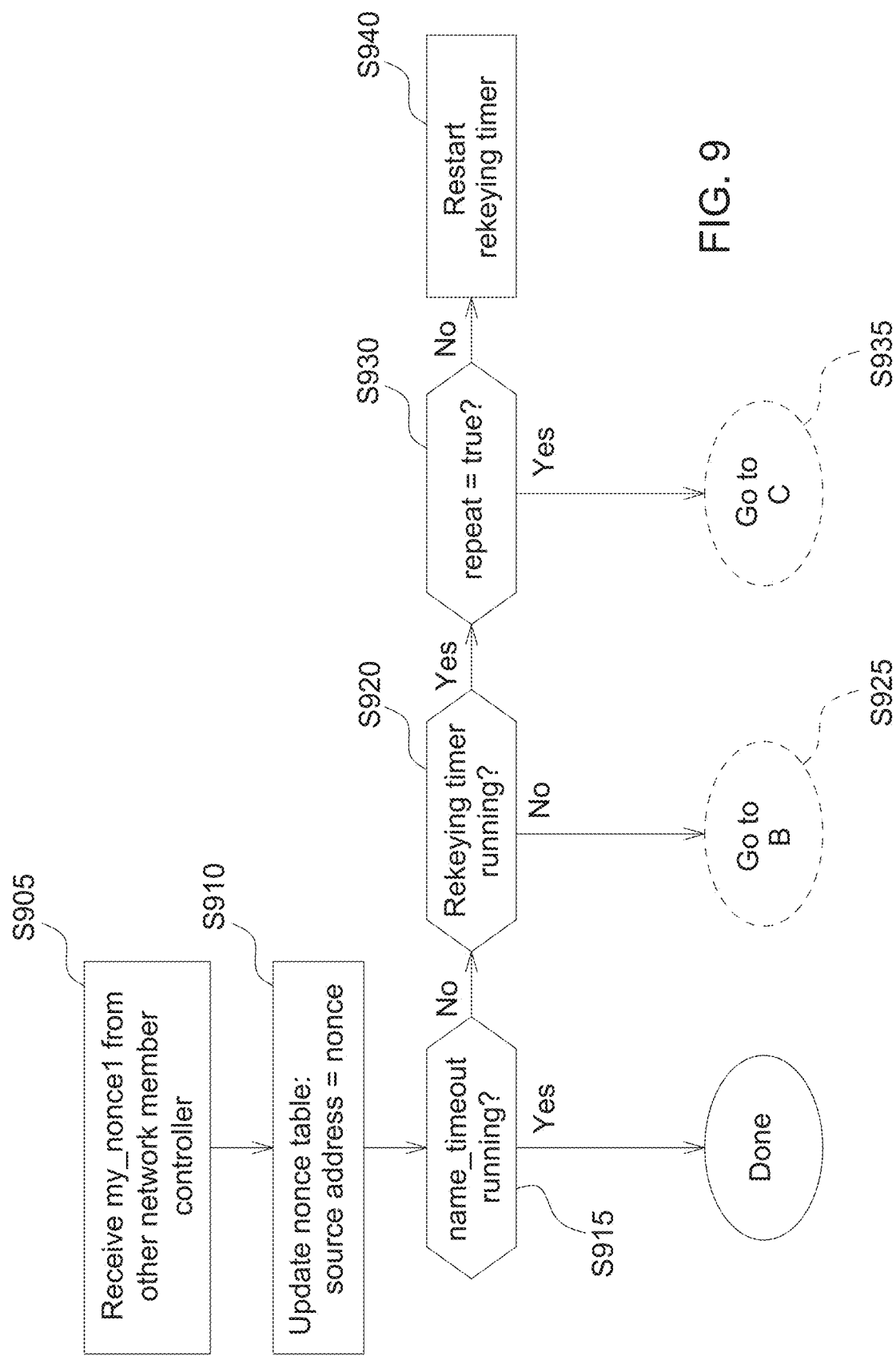

FIGS. 7-9 illustrate a rekeying process according to other example embodiments.

The rekeying process in FIG. 7 may be performed by any network member controller.

At S700, a network member controller powers-on. Upon powering-on, the network member controller initiates a rekeying process. At S705, the network member controller clears the nonce table. Each network member controller stores a nonce table in their respective memory to contain the received nonce values and its generated nonce value for an iteration of the rekeying process. The nonce table may be a dictionary of nonces and uses source addresses of the network member controllers, respectively as keys, and the stored nonces as the stored values.

Moreover, the network member controller sets a first rekey flag to true and a repeat rekey flag to false. Each network member controller stores a first rekey flag and a repeat rekey flag in a storage device.

At S710, the network member controller performs an address claim by broadcasting a source address it intends to use, receives source addresses from other network member controllers and waits for the address claim process to complete. During name stabilization, a network member controller may be able to communicate to another network member controller that is also claiming that address to resolve conflicts. However, in some example embodiments, the network member controllers are not permitted to communicate with each other for communications other than address allocation. The network controller uses a table timer name_timeout to wait. For example, the table timer name_timeout may be 250 ms for the name stabilization to complete. During the waiting period at S710, the network member controller receives name and source address indications from other network member controllers. In example embodiments, S710 may be performed by the network member controller in accordance with J1939 address claim stabilization, as provided in SAE J1939-81, March 2017, the entire contents of which are hereby incorporated by reference. The name of FIG. 7 may be the same as the NAME described in J1939.

Upon the table timer name_timeout expiring, the network member controller generates a nonce value and stores the nonce value in the nonce table at S715. The network member controller may generate the nonce value using a TRNG or a cryptographic PRNG (seeded with at least 128 bits of entropy), for example. The nonce value may be 128 bits.

At S720, the network member controller determines whether the first rekey flag is set to true. During steps S700-S710, the network member controller may listen to messages being exchanged on the bus. Thus, based on the messages received, the network member controller may receive a start rekey message or a nonce value from another network member controller before proceeding S715. If the network member controller receives a start rekey message from another network member controller, the network member controller sets the first rekey flag to false and sets the repeat key flag to true.

If the network member controller determines the first rekey flag is set to true, the network member sends a start rekey message at S725. The start rekey message may be a message that has no security and may be 8 bytes long. After sending the start rekey message, the network member controller broadcasts a my_nonce1 rekeying message on the bus. The my_nonce1 rekeying message is similar to the my_nonce rekeying message in that they both contain a nonce value and a transformed value of the network key $S_N$.

In example embodiments, the rekeying message my_nonce1 does not contain a flag in the message. The rekeying message my_nonce1 may be 32 bytes including the nonce value (16 bytes) and the transformed value of the network key $S_N$ (16 bytes).

Referring back to S720, if the network member controller determines the first rekey flag is false, the network member controller proceeds to S735 and broadcasts the my_nonce1 rekeying message on the bus.

At S740, the network member controller sets the repeat rekey to false and starts a rekeying timer rekey_timeout at S745. In some example embodiments, the rekeying timer rekey_timeout may be 250 ms. Each network member controller may maintain a separate rekeying timer. However, the length of the rekeying timer rekey_timeout is the same throughout the network.

At S750, the network member controller receives nonce values in my_nonce1 rekeying messages from other network member controllers. The network member controller performs S750 until the rekeying timer rekey_timeout has expired. During S700-S765, the network member controller also monitors the bus for start rekey messages from other network member controllers and nonce values in a my_nonce1 rekeying message from other network member controllers. If the network member controller receives a start rekey message or a my_nonce1 rekeying message prior to completing S750, the network member controller S745 may restart the rekeying timer rekey_timeout, as described in FIGS. 8 and 9. If the network member controller receives a start rekey message or a my_nonce1 rekeying message after completing S750, the network member controller may calculate symmetric key $S_V$ using the nonce values obtained before completion of S750. Even after the network member controller calculates the new symmetric key $S_V$, the network member controller may continue to look for a start rekey and my_nonce1 messages.

FIG. 8 illustrates a process of receiving a start rekey message from another network member controller. At S800, the network member controller receives a start rekey message from another network member controller. At S805, the network member controller then sets its first rekey flag to false and its repeat rekey flag to true. At S810, the network member controller then determines whether the rekeying timer rekey_timeout is running. If the network member controller determines the rekeying timer rekey_timeout is running, the network member controller restarts rekeying timer rekey_timeout at S815. In more detail, S815 may be performed at step S745. Thus, after restarting the rekeying timer rekey_timeout at S815, the network member controller may monitor the bus and receive nonce values at S750, shown in FIG. 7.

FIG. 9 illustrates a process of receiving a my_nonce1 rekeying message from another network member controller. At S905, the network member controller receives a my_nonce1 rekeying message from another network member controller. Upon receiving the my_nonce1 rekeying message, the network member controller updates the nonce table at S910. More specifically, the network member controller associates the source address of the other network member controller with the received nonce value.

At S915, the network member controller determines whether the table timer name_timeout is running. If the network member controller determines the table timer name_timeout is running, the network member controller is in the name stabilization process and the method ends.

If the network member controller determines the table timer name_timeout is not running at S915, the network member controller determines whether the rekeying timer rekey_timeout is running at S920. If the rekeying timer rekey_timeout is not running, the network member controller determines that a rekeying initiated from another network member controller is occurring and goes to step B (in FIG. 7) at S925. If the network member controller determines the rekeying timer rekey_timeout is running, the network member controller determines whether the repeat rekey flag is true at S930. If the network member controller determines the repeat rekey flag is true, the network member controller determines that a nonce value previously sent by the network member controller during the rekeying process should be sent again. Therefore, at S935, the network member controller goes to step C in FIG. 7, wherein the nonce value is again sent in a my_nonce1 rekeying message. If the network member controller determines that the repeat rekey flag is false, the network member controller restarts the rekeying timer rekey_timeout at S940. It should be noted that S940 may be the same as S745. Thus, after restarting the rekeying timer rekey_timeout at S940, the network member controller continues to monitor the bus for my_nonce1 rekeying messages from other network member controllers.

Referring back to FIG. 7, when the rekeying timer rekey_timeout expires at S750, the network member controller determines the new shared symmetric key $S_V$ using the nonce value generated in step S715 and the nonce values received from the other network member controllers at S765 (i.e., the nonce value a particular network member controller used and the nonce values received from all other network member controllers). At S765, the network member controller clears the nonce table and sets the first rekey flag to true and the repeat rekey flag to false.

Figure 10A:
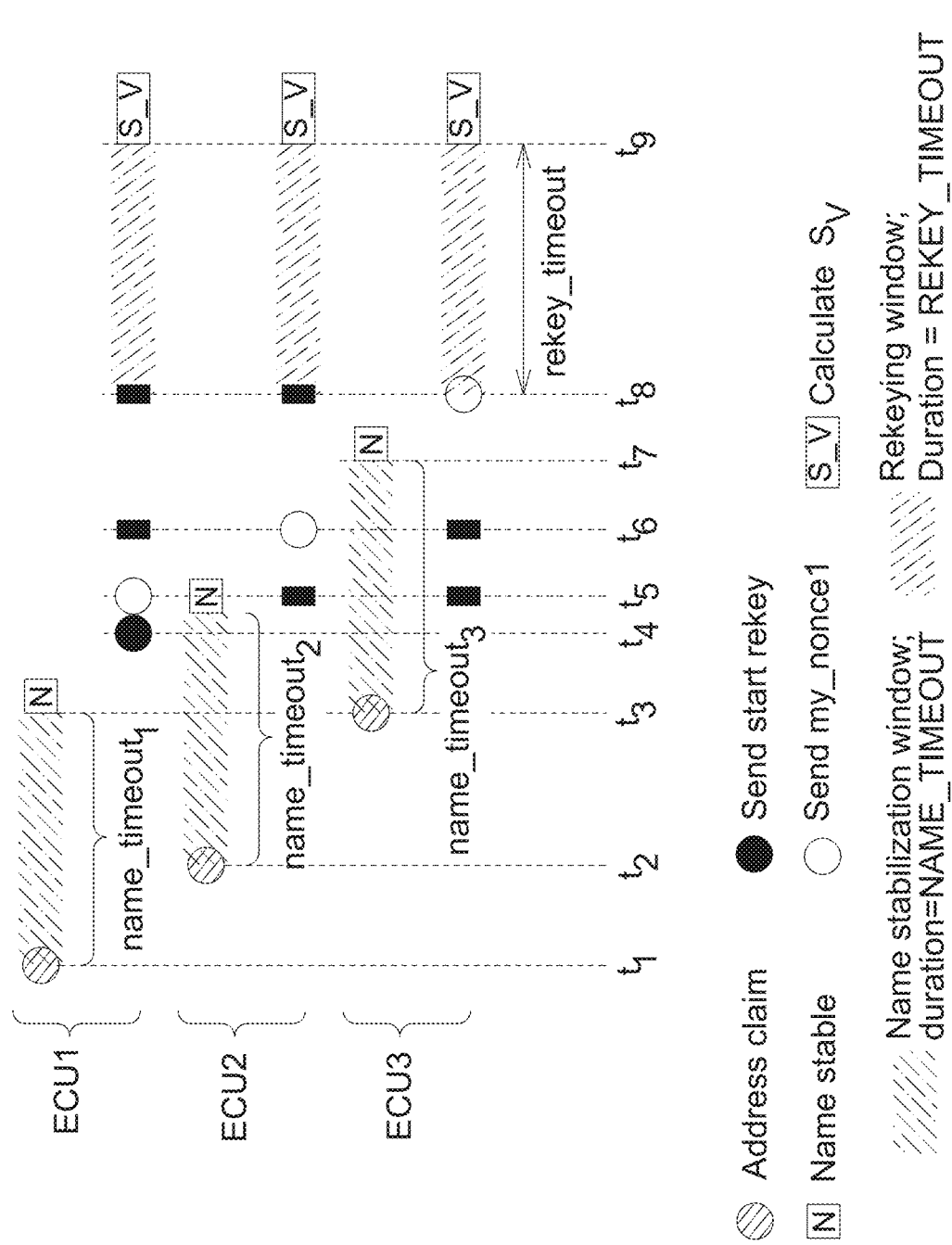
FIGS. 10A-10C illustrate timing diagrams of example embodiments of the methods described in FIGS. 7-9.
Figure 10B:
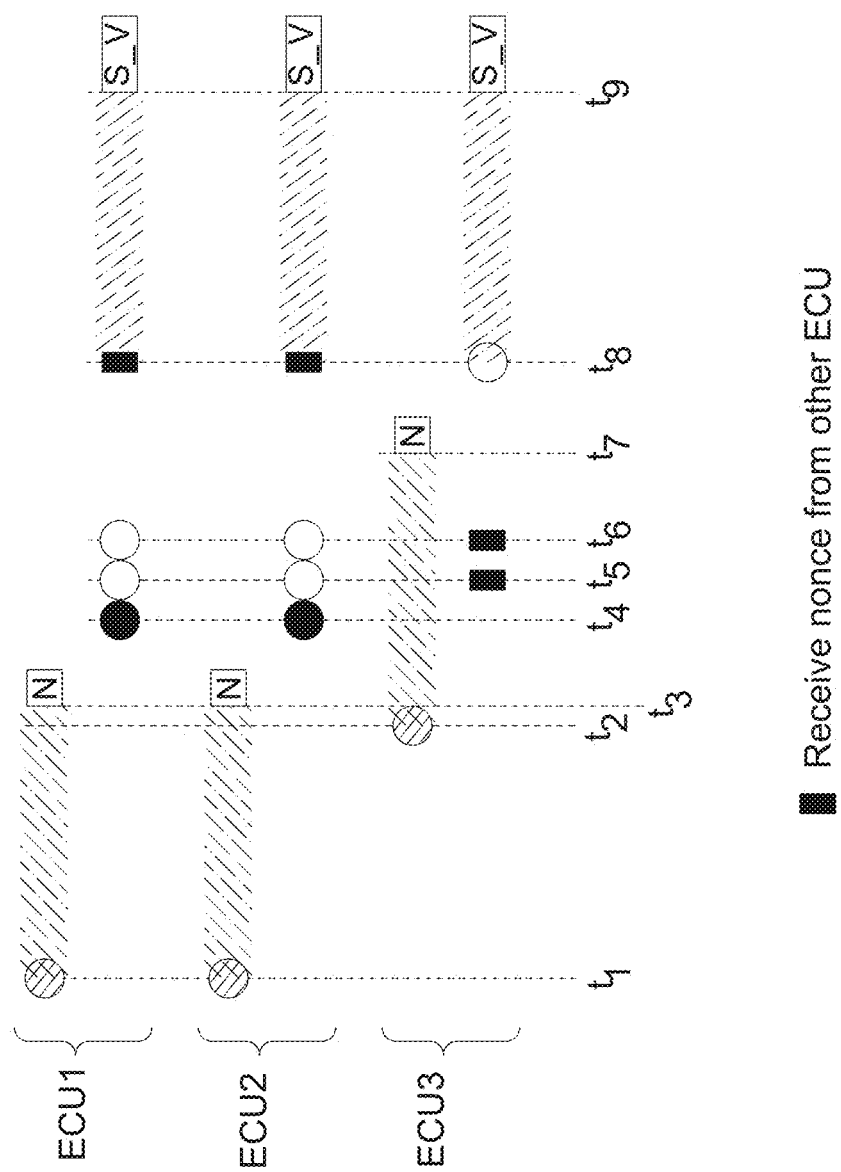
Figure 10C:
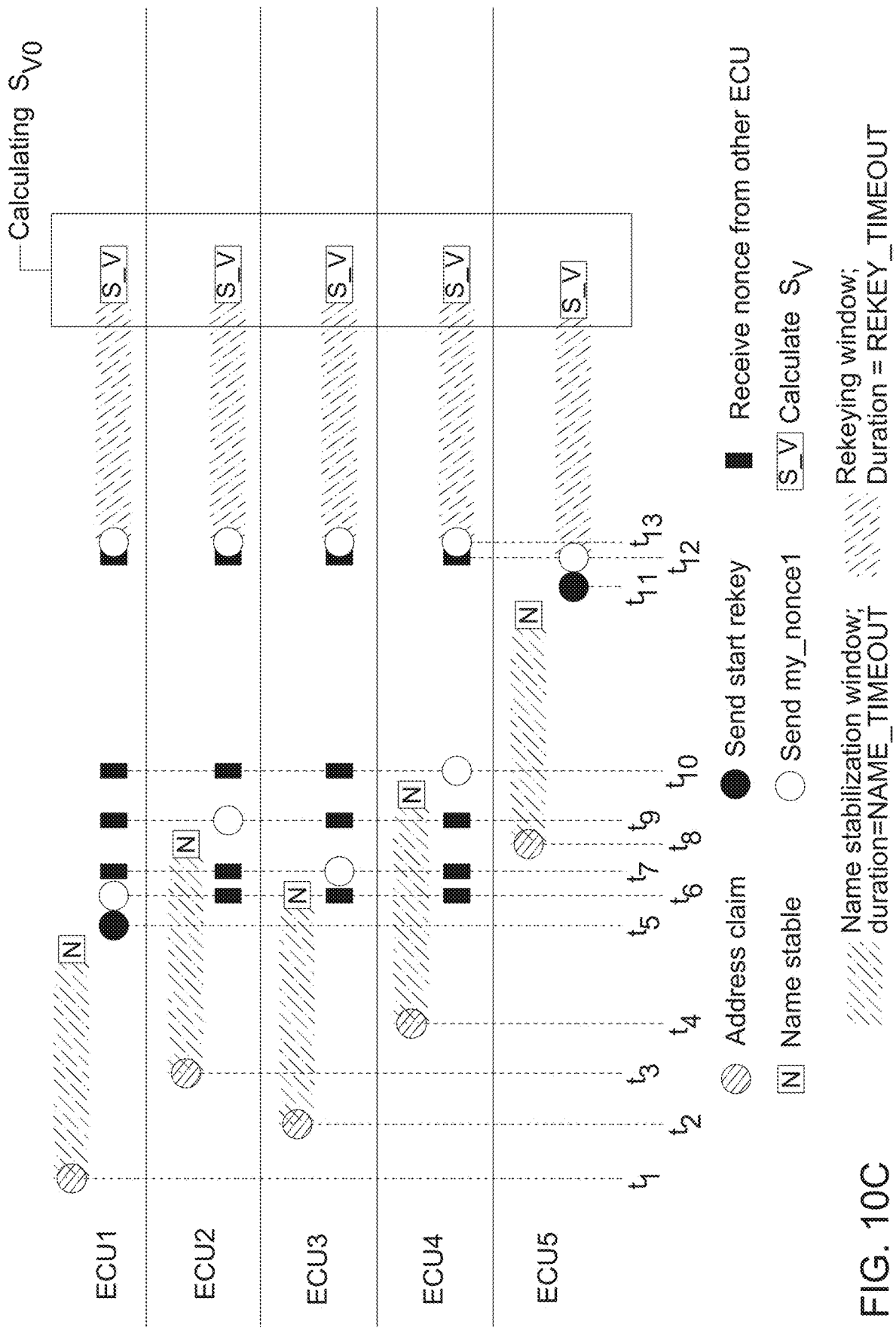

FIGS. 10A-10C illustrate timing diagrams of example embodiments of the methods described in FIGS. 7-9.

FIG. 10A illustrates a timing diagram where all network member controllers are aware of the start rekey message during name stabilization.

As shown in FIG. 10A, network member controllers ECU1, ECU2 and ECU3 power on and send an address claim at $t_1$-$t_3$, respectively, where ECU1 powers on before the network member controllers ECU2 and ECU3 and the network member controller ECU2 powers on before the network member controller ECU3. Each network member controller ECU1-ECU3 starts the table timer name_timeout upon sending an address claim.

At $t_3$, the table timer name_timeout1 for the network member controller ECU1 expires and the network member controller ECU1 completes the name stabilization process. At $t_4$, the network member controller ECU1 then sends a start rekey message on the bus. The network member controllers ECU2 and ECU3 are in the name stabilization process (i.e., the table timers name_timeout2 and name_timeout3 are running) at $t_4$. Consequently, the network member controllers ECU2 and ECU3 receiving the start rekey message from the network member controller ECU1.

At $t_5$, the network member controller ECU1 sends a my_nonce1 rekeying message with a nonce value (a first nonce value). At $t_5$, the network member controller ECU2 has completed the name stabilization process and the network member controller ECU3 is in the name stabilization process. Consequently, the network member controllers ECU2 and ECU3 receive the my_nonce1 rekeying message with the nonce value generated by the network member controller ECU1.

Because the network member controllers ECU2 and ECU3 received the start rekey message from the network member controller ECU1, the network member controllers ECU2 and ECU3 reset their first rekey flags to false (see FIG. 8). Therefore, in the example embodiment of FIG. 10A, the network member controller ECU2 generates a nonce value (second nonce value) and sends the nonce value on the bus in a my_nonce1 rekeying message at $t_6$ and does not send a start rekey message. The network member controllers ECU1 and ECU3 restart their rekeying timers rekey_timeout upon receiving the second nonce value.

Similarly, at $t_8$, the network member controllers ECU3 generates a nonce value (third nonce value) and sends the third nonce value on the bus in a my_nonce1 rekeying message and does not send a start rekey message. At $t_8$, the network member controllers ECU1 and ECU2 restart their rekeying timers rekey_timeout upon receiving the third nonce value.

At $t_8$, when all network member controllers receive the third nonce value from the network member controller ECU3, each network member controller starts a rekeying timer rekey_timeout. When a rekeying timer rekey_timeout expires for a particular network member controller, the particular network member controller determines the new shared symmetric key $S_V$ using the first nonce value, the second nonce value and the third nonce value. It should be noted that the shared symmetric key $S_V$ is determined using the same algorithms as described above (e.g., equations (5)-(8)).

FIG. 10B illustrates a timing diagram of a rekeying process according to example embodiments where two network member controllers each provide a start rekey message on a bus at a same time.

As shown in FIG. 10B, network member controllers ECU1 and ECU2 power on and/or join the network and send an address claim at $t_1$. Each network member controller ECU1-ECU2 starts the table timer name_timeout upon sending an address claim.

At $t_2$ and during the name stabilization processes of the network member controllers ECU1 and ECU2, the network member controller ECU3 powers on and/or joins the network and sends an address claim.

At $t_3$, the table timer name_timeout1 for the network member controller ECU1 and the table timer name_timeout2 for the network member controller ECU2 expire and the network member controllers ECU1 and ECU2 complete the name stabilization process. At $t_4$, the network member controllers ECU1 and ECU2 then send a start rekey message on the bus. The network member controller ECU3 is in the name stabilization process (i.e., the table timer name_timeout3 is running) at $t_4$. Consequently, the network member controller ECU3 receives the start rekey messages from the network member controllers ECU1 and ECU2. The network member controller ECU1 receives the start rekey message from the network member controller ECU2 and the network member controller ECU2 receives the start rekey message from the network member controller ECU1. Because each of the network member controllers ECU1-ECU3 receive a start rekey message, each network member controller ECU1-ECU3 sets a first rekey flag to false (at S805 in FIG. 8) and sets a repeat rekey flag to true (a S805 in FIG. 8).

At $t_5$, after sending the start rekey messages, the network member controllers ECU1 and ECU2 send my_nonce1 rekeying messages with their respective nonce values (a first nonce value associated with the network member controller ECU1 and a second nonce value associated with the network member controller ECU2) (e.g., S735 of FIG. 7). The network member controller ECU1 receives the second nonce value and the network member controller ECU2 receives the first nonce value.

At $t_5$, the network member controllers ECU1 and ECU2 start rekeying timers rekey_timeout.

At $t_5$, network member controller ECU3 is in the name stabilization process. Consequently, the network member controller ECU3 receives the my_nonce1 rekeying messages with the first and second nonce values, respectively.

At $t_6$, the network member controller ECU1 sends a my_nonce1 rekeying message with the first nonce value in response to the start rekey message from the network member controller ECU2 (steps S930 and S935 in FIG. 9). At $t_6$, the network member controller ECU2 sends a my_nonce1 rekeying message with the second nonce value in response to the start rekey message from the network member controller ECU1 (steps S930 and S935 in FIG. 9). The network member controller ECU3 is in the name stabilization process at $t_6$ and does not send a my_nonce1 rekeying message.

As shown in FIG. 7, a network member controller sends a my_nonce1 rekeying message after sending a start rekey message. Thus, when another network member controller receives the start rekey message, the another network member controller also receives the my_nonce1 rekeying message. Accordingly, the another network member controller, performs FIG. 8 (setting the repeat flag to true), sees that the repeat flag is true, and goes to C (in FIG. 7) where the another network member controller resends its associated nonce value.

At $t_7$, the table timer name_timeout3 for the network member controller ECU3 expires and the network member controller ECU3 completes the name stabilization process. At $t_8$, the network member controller ECU3 generates a nonce value (third nonce value) and sends the nonce value on the bus in a my_nonce1 rekeying message and does not send a start rekey message (at S720 and S735 in FIG. 7).

The time span between when the rekey timer was last restart and $t_8$ is less than the time period of the rekeying timer rekey_timeout. Upon sending/receiving the third nonce values, the network member controllers ECU1-ECU3 restart their rekeying timers rekey_timeout, respectively. At $t_9$, when all network member controllers have the third nonce value from the network member controller ECU3, each network member controller starts a rekeying timer rekey_timeout. When a rekeying timer rekey_timeout expires for a particular network member controller, the particular network member controller determines the new shared symmetric key $S_V$ using the first nonce value, the second nonce value and the third nonce value. It should be noted that the shared symmetric key $S_V$ is determined using the same algorithms as described above (e.g., equations (5)-(8)).

FIG. 10C illustrates a timing diagram of a rekeying process according to example embodiments where a network member controller joins the network and/or powers on after a start rekey message is sent.

As shown in FIG. 10C, the network member controller sends a start rekey message on the bus at $t_8$. Since network member controllers ECU2-ECU4 send an address claim before $t_5$, the network member controllers ECU2-ECU4 receive the start rekey message from the network member controller ECU1.

A network member ECU5 sends an address claim at $t_8$ and after the network member controller ECU1 sends the start rekey message. When the network member controller ECU5 completes the name stabilization process, the network member controller ECU5 sends a start rekey message at tn. In FIG. 10C, the time period between $t_{10}$ and $t_{11}$ is less the period of time of the rekeying timer rekey_timeout.

At $t_{12}$, the network member controller ECU5 generates a nonce value and sends the nonce value in a my_nonce1 rekeying message for the start rekey message the network member controller ECU5 sent at $t_{11}$.

At $t_{13}$, the network member controllers ECU1-ECU4 rebroadcast the nonce values, respectively, in response to the start rekey message generated by the network member controller ECU5 and send the nonce values on the bus. The network member controllers ECU1-ECU5 re-start a rekeying timer rekey_timeout every time they receive a nonce value. When a rekeying timer rekey_timeout expires for a particular network member controller, the particular network member controller determines the new shared symmetric key $S_V$ using the nonce values of the network member controllers ECU1-ECU5. It should be noted that the shared symmetric key $S_V$ is determined using the same algorithms as described above (e.g., equations (5)-(8)).

FIG. 11 illustrates a timing diagram of the transition from a symmetric key $S_{V0}$ to a symmetric key $S_{V1}$ according to some example embodiments in accordance with FIGS. 7-10C. While FIG. 11 is described from the perspective of the network leader, it should be understood that any other network member controller may perform the steps described with reference to FIG. 11.

At S1100, the network leader receives a start rekey message from a first network member controller. Prior to receiving the start rekey message, the network leader and other network member controllers are using the symmetric key $S_{V0}$. At S1102, the network leader receives a my_nonce1 rekeying message with a nonce value generated by the first network controller member.

At S1105, the network leader broadcasts a rekeying message with its nonce value to the first network member controller and a second network member controller. Moreover, the network leader receives a broadcasted my_nonce1 rekeying message from the second network member controller with a nonce value generated by the second network member controller (and any other remaining network member controllers). While the method of FIG. 11 illustrates three network member controllers, it should be understood the network may include more or less than three members.

At S1107 and after S1105, the network leader starts a rekeying timer rekey_timeout for the rekeying process after receiving the nonce values from the network member controllers in the network.

At S1115, the rekeying timer rekey_timeout of the network leader expires. When the rekeying timer expires, the network leader determines the symmetric key $S_{V1}$ at S1120.

After determining the symmetric key $S_{V1}$, the network leader may receive messages with the symmetric key $S_{V1}$ or the symmetric key $S_{V0}$.

For example, upon receiving a message with the symmetric key $S_{V1}$ at S1125, the network leader starts a transition timer. The transition timer is set to a time period (e.g., 250 ms) where both the symmetric key $S_{V1}$ and the symmetric key $S_{V0}$ are used. As shown in FIG. 11, it is possible for the network leader to receive a message using the symmetric key $S_{V0}$ after receiving a message using symmetric key $S_{V1}$ due to a non-first-in-first-out (FIFO) (e.g., CAN priority arbitration and/or stuck in gateway queue) of the network.

Once the transition timer expires at S1130, the network leader stops using the symmetric key $S_{V0}$.

In example embodiments, each transmitter has a field value $FV_x$. In example embodiments described herein, each network member controller has a single transmitter. Thus, for the sake of clarity, the below description recites a FV of a network member controller which refers to the FV of the transmitter of the network member controller. However, it should be understood that a controller may have more than one transmitter.

Thus, the $FV_x$ is not global, rather each network member controller has its own FV (e.g., $FV_1$-$FV_J$ for J network member controllers). The $FV_x$ of a network member controller is incremented monotonically when a message is created and loaded in a transmit queue of the network member controller. The transmit queue may not be first-in-first-out (FIFO). Thus, messages may leave the queue with FVs out of order (e.g., CAN FD priority arbitration).

In some example embodiments, the network member controllers use a sliding window to receive out of order messages. More specifically, each network member controller tracks the $FV_x$ of each transmitting network member controller x that the network member controller receives messages from. The receiving network member controller may accept out-of-order FVs in a window. In an example embodiment, the window is 64 counts.

In example embodiments, the network member controller does not reuse a FV value for a symmetric key $S_V$ such that messages are not rejected as a replay. When a network member controller receives a message from a transmitting network member controller with a reused FV, the receiving network member controller rejects the message. After a fixed number of rejected messages, the receiving member starts the rekeying process.

Each network member controller stores two sliding windows for each other network member controller the network member controller is listening to. Each network member controller may have two freshness value sliding windows to take into account when the network member controller receives valid messages from another transmitter with the old symmetric key $S_V$ (e.g., $S_{V0}$) while also receiving valid messages with a new symmetric key $S_V$ (e.g., $S_{V1}$). In some example embodiments, the sliding windows are stored in random access memory (RAM).

Figure 12:
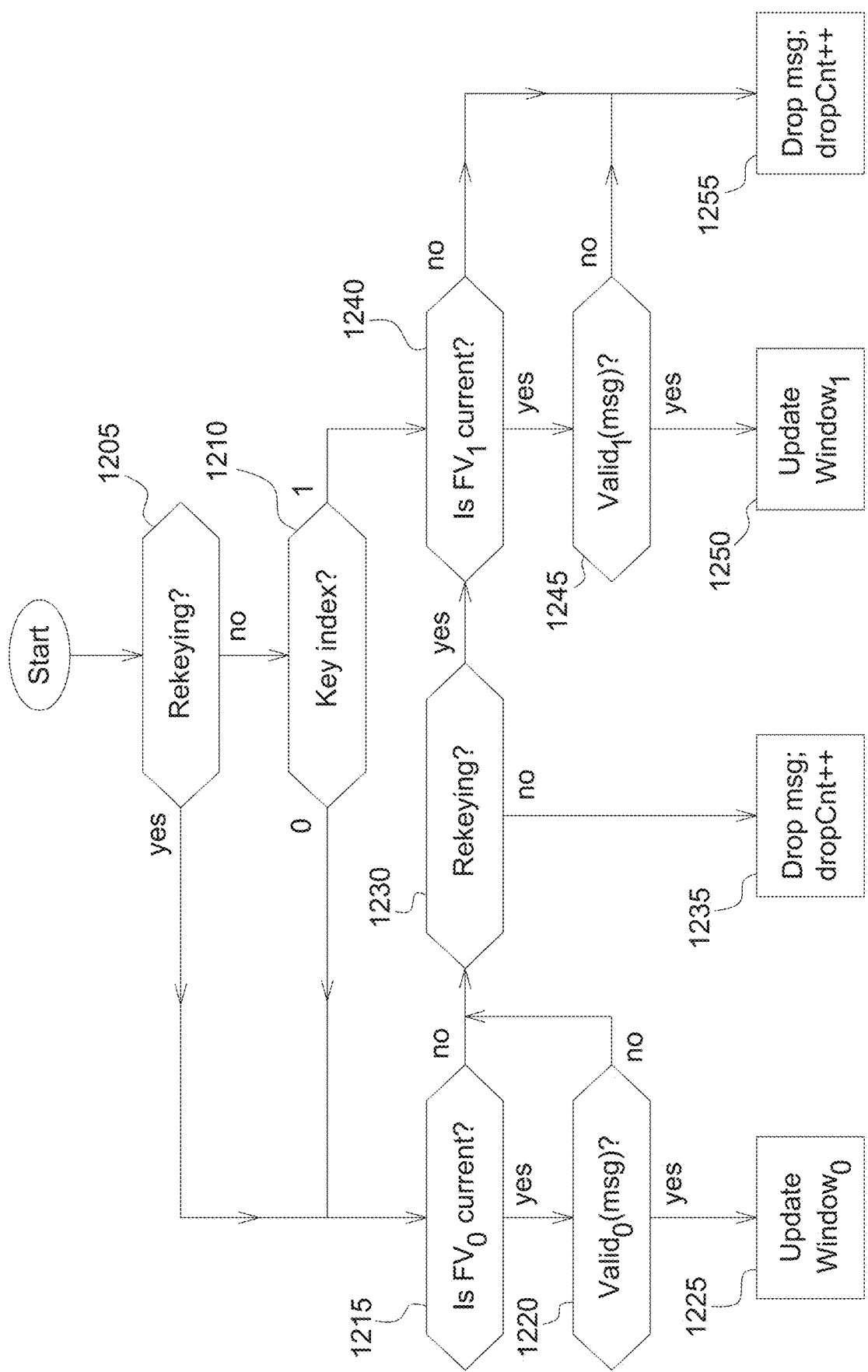

FIG. 12 illustrates a method of managing freshness values according to some example embodiments. The method of FIG. 12 can be performed by any one of the network member controllers that receives messages (a receiving controller) from another network member controller (a transmitting controller).

At S1205, the network member controller determines whether a rekeying process is occurring (e.g., S400-S435 in FIG. 4).

If the network member controller determines a rekeying process is not occurring, the network member controller uses the key indicated by the key index (S1210) (i.e., $S_{V0}$ or $S_{V1}$ where 0 and 1 are index values). In the description below, $FV_0$ is the freshness value associated with the symmetric key $S_{V0}$ and $FV_1$ is the freshness value associated with the symmetric key $S_{V1}$. The subscripts used in FIG. 12 correspond to the index and symmetric key.

If the network member controller determines a rekeying process is occurring, the network member controller determines whether the freshness value $FV_0$ in the received message is fresh for the symmetric key $S_{V0}$ at S1215. More specifically, the network member controller determines whether the received freshness value $FV_0$ has been reused, or is too old (the difference between the maximum freshness value $FV_0$ value received and the freshness value $FV_0$ value in the message exceeds the window (e.g., 64)).

If the network member controller determines the freshness value $FV_0$ to be fresh, the network member controller determines if the received message is valid at S1220. The network member controller calculates a tag'* (described in more detail with reference to FIG. 13B) and compares the tag'* to a tag* in the received message. If the tag'* matches tag* then the message is valid.

If the network member controller determines the received message is not valid, the process proceeds to S1230.

If the network member controller determines the received message is valid, the network member controller updates the sliding window associated with the transmitting network member controller and the symmetric key $S_{V0}$ (window$_0$), at S1225. The sliding window may be 64 bits, with one bit per FV, where $W_{tk}$ is a sliding window bit field managed by a receiving network member controller for a transmitting network member controller t and k indicates the symmetric key being used (the symmetric key $S_{V0}$ or the symmetric key $S_{V1}$)

$$W_{tk} = b_{63} \ldots b_0 = W_{tk}[63] \ldots W_{tk}[0] \text{ and} \quad (9)$$

$$W_{tk}[63] == 1 \quad (10)$$

The receiving network member controller slides the window associated with the transmitting network member controller and the symmetric key $S_{V0}$ when the receiving network member controller receives a FV from the transmitting network member controller that is greater than the maximum $FV_0$ the receiving network member controller has received so far from the transmitting network member controller using the symmetric key $S_{V0}$. Note the receiving network member controller tracks the previous 63 FVs transmitted to and received by the receiving network member controller.

If the received freshness value $FV_0$ has been reused or exceeds a maximum freshness value $FV_0$, the freshness value $FV_0$ is determined to not be fresh at S1215 and the network member controller determines whether a rekeying process is occurring at S1230.

At S1230, the network member controller again determines whether a rekeying process is occurring. If the network member controller determines that a rekeying process is not occurring at S1230, the network member controller determines the received message is an invalid message (e.g., the received message is not fresh or the tag is wrong).

If the network member controller determines that a rekeying process is occurring, the network member controller drops the received message at S1235. Each network member controller stores a counter, dropCnt$_x$, to determine the state of communications using the tables.

At S1235, the network member controller increases the counter dropCnt$_x$ when the network member controller determines no rekeying is occurring at S1230. Tables 4-5 illustrate the operation of the network member controller based on values of the counter dropCnt$_x$.

TABLE 4

| Event | Counter update |
| --- | --- |
| Start state | dropCnt = 0 |
| Receive wrong MAC | dropCnt++ |
| Receive good MAC | dropCnt-- |

TABLE 5

| State | Value | Result |
| --- | --- | --- |
| Reset | dropCnt > 100 | ask for rekey |
| Passive | dropCnt > 50 | set a diagnostic trouble code (DTC) |
| On | dropCnt <= 50 | normal operation |

If the network member controller determines a rekeying process is occurring at S1230 or receives a message using the symmetric key $S_{V1}$ at S1210, the network member controller determines whether the freshness value $FV_1$ in the received message is fresh for the symmetric key $S_{V1}$ at S1240.

S1245, S1250 and S1255 are performed in the same manner as S1220, S1225 and S1235, except S1245 and S1250 are performed with respect to the symmetric key $S_{V1}$.

FIG. 13A illustrates a CAN FD message format. As shown in FIG. 13A, a CAN FD message 1300 includes a header field 1305, a data field 1310 and a trailer 1315. The data field 810 can be 12, 16, 20, 24, 32, 48 or 64 bytes.

FIG. 13B illustrates a data field format for a 128 bit length data field according to example embodiments.

As shown in FIG. 13B, the format includes a data field 1320, a FV field 1325, an encryption field 1330 and a tag* field 1335.

The encryption field 1330 is one bit and indicates whether a message is encrypted. A bit value of 1 may indicate that the message is encrypted and a bit value of 0 may indicate the message is not encrypted. The types of messages (e.g., parameter group numbers (PGNs)) that are to be sent securely (and possibly encrypted), may be determined and/or selected based on specific requirements and may be built into programming payloads for each controller.

The data field 1320 is 0 to 64 bits of encrypted data CT. As shown in FIG. 13B, the encrypted data CT is generated as follows:

$$\text{AES-128-CTR}(S_{V\text{-}ENC}, PT, IV)$$

where PT is plaintext data to encrypt and IV is a combination of a nonce value and AES block count that is incremented for each 128 bit block that is encrypted.

The FV field 1325 is between the data field 1320 and the encryption field 1330 and may be 32 bits.

The tag* field 1335 is after the encryption field 1330. The tag* field 1335 includes a truncated tag that is the 31 leftmost bits (e.g., most significant bits) of:

$$\text{CMAC}(S_{V\text{-}MAC}, \text{nonce} \| CT)$$

where the nonce value in the CMAC is $$\text{msg-id}\|FV\|E\|0_5$$

where msg-id is a 29-bit identifier (e.g., CAN arbitration ID) less 3 priority bits.

When a receiving network member receives a message with non-encrypted data PT, the receiving network member controller calculates a candidate truncated tag'* using the non-encrypted data PT, the FV and E bit. The receiving network member calculates the candidate tag' by CMAC ($S_{V-MAC}$, nonce$\|$PT). The receiving network member then determines the candidate truncated tag'* as the 31 leftmost bits of the candidate tag'. If the candidate truncated tag'* is the same as the truncated tag*, the receiving network member determines the received message is valid and not tampered with. The receiving network member gets all the information it needs for the nonce in the message. The receiving network member builds the identifier msg-id from the header 1305, the freshness value in the FV field 1325, the encryption bit E in the encryption field 1330.

When a receiving network member receives a message with the encrypted data CT, the receiving network member controller calculates a candidate truncated tag'* using the encrypted data CT and the FV. The receiving network member calculates the candidate tag' by CMAC($S_{V-MAC}$, nonce$\|$CT). The receiving network member then determines the candidate truncated tag'* as the 31 leftmost bits of the candidate tag'. If the candidate truncated tag'* is the same as the truncated tag*, the receiving network member determines the received message is valid and not tampered with. The receiving network member then decrypts CT as $$\text{AES-128-CTR}(S_{V-ENC}, CT, IV)$$

Example embodiments being thus described, the same may be varied in many ways. Such variations are not to be regarded as a departure from the spirit and scope of example embodiments, and all such modifications as would be obvious to one skilled in the art are intended to be included within the scope of the claims.

What is claimed is:

1. A system comprising:
a first controller configured to generate a network key and transform the network key; and
a second controller configured to obtain the transformed network key, recover the network key based on the transformed network key, and form a network with the first controller based on the network key, each of the first controller and the second controller being configured to generate a same symmetric key using the network key and values from the other of the first controller and second controller, the first controller and the second controller being network members when the network is formed,
wherein the first controller is further configured to generate a symmetric shared key between the first controller and the second controller using the network key, the symmetric shared key including a first key for encryption and a second key for message authentication code (MAC), the symmetric shared key being different from the same symmetric key.

2. The system of claim 1, wherein the first controller and the second controller are configured to communicate over a vehicle data bus.

3. The system of claim 2, wherein the vehicle data bus is a controller area network flexible data (CAN FD) bus, Ethernet, a sub-combination thereof or a combination thereof.

4. The system of claim 2, wherein each of the first controller and the second controller are configured to generate the same symmetric key at a selected event.

5. The system of claim 4, wherein the selected event is a new power cycle, a third controller joins the network, a security challenge, a lapse of a timer, a clearing of a counter, a request to upload software to reprogram one of the network member, a reset of one of the network members in the network, a rollover of a freshness value, a reboot of one of the network members, a sub-combination thereof or a combination thereof.

6. The system of claim 2, wherein the first controller includes an identification number, the identification number being a determined number, and the first controller is configured to,
send at most a portion of the identification number of the first controller,
obtain at most a portion of an identification number of the second controller, and
form the network in response to the identification number of the first controller and the identification number of the second controller being the same.

7. The system of claim 6, wherein the identification number of the first controller is part of a public key certificate.

8. The system of claim 7, wherein the identification number of the first controller is a vehicle identification number (VIN) certificate.

9. The system of claim 7, wherein the identification number of the first controller is a unique manufactured code.

10. The system of claim 2, wherein the first controller includes a hardware security module (HSM) for storing the network key.

11. The system of claim 2, wherein the first controller is configured to perform a process to include a third controller in the network when generating the same symmetric key.

12. The system of claim 2, wherein the first controller is configured to communicate with the second controller using the same symmetric key.

13. The system of claim 2, wherein the first controller is configured to generate the same symmetric key by
generating a first nonce value,
sending the first nonce value to the second controller,
receiving a second nonce value from the second controller, and
determining the same symmetric key after a threshold time of receiving the second nonce value based on the network key, the first nonce value and the second nonce value.

14. The system of claim 2, wherein the first controller is configured to send messages to the second controller having encrypted data and a freshness value (FV).

15. The system of claim 14, wherein each message includes a data field between 0 and 64 bits, a freshness value field of 32 bits for the FV, an encryption field of one bit to indicate the data field includes encrypted data and a tag field of 31 bits.

16. The system of claim 14, wherein the first controller is configured to increment the FV when one of the messages is placed in a transmit queue.

17. The system of claim 14, wherein the first controller is configured to reset the FV when the same symmetric key is generated.

18. A method comprising:
generating, by a first controller, a first network key;
transforming, by the first controller, the first network key;
forming a network of the first controller and second controllers using the first network key, the first network key being a shared key between the first controller and the second controllers and the first network key being recovered by the second controllers based on the transformed network key;
obtaining values from the second controllers;
determining a common symmetric key for the network based on the first network key and the values from the second controllers and a value of the first controller; and
generating a symmetric shared key between the first controller and the second controllers using the first network key, the symmetric shared key including a first key for encryption and a second key for message authentication code (MAC), the symmetric shared key being different from the common symmetric key.

19. The method of claim 18, wherein the first controller and the second controllers are on a vehicle data bus.

20. The method of claim 19, wherein the vehicle data bus is a controller area network flexible data (CAN FD) bus, Ethernet, a sub-combination thereof or a combination thereof.

21. The method of claim 19, wherein the forming the network includes,
transforming the first network key; and
broadcasting the transformed first network key on a vehicle data bus to the second controllers.

22. The method of claim 21, wherein the forming the network includes,
broadcasting at most a portion of an identification number of the first controller on the vehicle data bus;
obtaining at most a portion of an identification number of at least one of the second controllers; and
validating the at least one second controller using the portion of the identification number.

23. The method of claim 22, wherein the identification number of the first controller is part of a public key certificate.

24. The method of claim 22, wherein the forming the network includes,
generating the first key for encryption and the second key for message authentication code (MAC) between the first controller and the at least one second controller.

25. The method of claim 19, wherein the values from the second controllers and the value of the first controller are nonce values.

26. The method of claim 25, wherein the determining the common symmetric key includes,
ordering the nonce values, and
determining the common symmetric key based on the ordered nonce values and the first network key.

27. The method of claim 26, further comprising:
adding a third controller to the network during the determining the common symmetric key.

28. The method of claim 27, further comprising:
determining another symmetric key after the adding.

29. The method of claim 19, further comprising:
transmitting a message to one of the second controllers on the vehicle data bus after determining the common symmetric key, wherein the message includes encrypted data and a freshness value (FV).

30. The method of claim 29, wherein the message includes a data field between 0 and 64 bits, a freshness value field of 32 bits for the FV, an encryption field of one bit to indicate the data field includes encrypted data and a tag field of 31 bits.

31. The method of claim 29, further comprising:
incrementing the FV in response to the message being placed in a transmit queue.

32. The method of claim 29, further comprising:
resetting the FV in response to the common symmetric key being generated.

33. A controller comprising:
a memory storing instructions; and
a processor configured to execute the instructions to cause the controller to,
generate a network key and transform the network key;
transmit the transformed network key on a bus;
form a network with at least one other controller on the bus using the network key recovered by the at least one other controller based on the transformed network key;
generate a same symmetric key using the network key and a value from the at least one other controller; and
generate a symmetric shared key between the controller and the at least one other controller using the network key, the symmetric shared key including a first key for encryption and a second key for message authentication code (MAC), the symmetric shared key being different from the same symmetric key.

34. The controller of claim 33, wherein the bus is a vehicle data bus.

35. The controller of claim 33, wherein the processor is configured to execute the instructions to cause the controller to send a start rekey message to the at least one other controller before generating the same symmetric key.

* * * * *